US012063235B2

(12) United States Patent
Kishikawa et al.

(10) Patent No.: US 12,063,235 B2
(45) Date of Patent: Aug. 13, 2024

(54) COMMUNICATION CONTROL DEVICE, ANOMALY DETECTION ELECTRONIC CONTROL UNIT, MOBILITY NETWORK SYSTEM, COMMUNICATION CONTROL METHOD, ANOMALY DETECTION METHOD, AND RECORDING MEDIUM

(71) Applicant: Panasonic Intellectual Property Corporation of America, Torrance, CA (US)

(72) Inventors: Takeshi Kishikawa, Osaka (JP); Tomoyuki Haga, Nara (JP); Hideki Matsushima, Tokyo (JP)

(73) Assignee: PANASONIC INTELLECTUAL PROPERTY CORPORATION OF AMERICA, Torrance, CA (US)

( * ) Notice: Subject to any disclaimer, the term of this patent is extended or adjusted under 35 U.S.C. 154(b) by 991 days.

(21) Appl. No.: 17/015,569

(22) Filed: Sep. 9, 2020

(65) Prior Publication Data
US 2020/0412756 A1     Dec. 31, 2020

Related U.S. Application Data

(63) Continuation of application No. PCT/JP2019/017033, filed on Apr. 22, 2019.

(30) Foreign Application Priority Data

May 23, 2018   (JP) .................................. 2018-098984

(51) Int. Cl.
*H04L 9/40*     (2022.01)
*H04L 12/40*    (2006.01)

(52) U.S. Cl.
CPC .... *H04L 63/1425* (2013.01); *H04L 12/40013* (2013.01); *H04L 63/123* (2013.01);
(Continued)

(58) Field of Classification Search
CPC . H04L 63/1425; H04L 63/123; H04L 63/126; H04L 12/40013; H04L 12/40032;
(Continued)

(56) References Cited

U.S. PATENT DOCUMENTS 9,825,991 B2 * 11/2017 Ivanchykhin ...... G06Q 20/4015
10,158,717 B2 * 12/2018 Kishikawa ............. H04L 63/10
(Continued)

FOREIGN PATENT DOCUMENTS

CN     106953796 A  *  7/2017   ....... H04L 12/40006
CN     113359680 A  *  9/2021
(Continued)

OTHER PUBLICATIONS

Extended European Search Report issued Jun. 15, 2021 in corresponding European Patent Application No. 19806452.9.
(Continued)

*Primary Examiner* — Sarah Su
(74) *Attorney, Agent, or Firm* — Wenderoth, Lind & Ponack, L.L.P.

(57) ABSTRACT

A communication control device connects an engine ECU to a network and includes: a communicator that receives a message from the engine ECU and transmits the message to the network, and receives a message from the network and transmits the message to the engine ECU; a transmission ID list holder that holds a transmission ID list including a transmission ID included in the message from the engine ECU; and a controller that controls the communicator and the transmission ID list holder. When the transmission ID included in the message from the engine ECU is not in the transmission ID list, the controller adds the transmission ID to the transmission ID list and transmits information related to the transmission ID list to the network.

8 Claims, 14 Drawing Sheets

(52) U.S. Cl.
CPC .............. *H04L 2012/40215* (2013.01); *H04L 2012/40273* (2013.01)

(58) Field of Classification Search
CPC ..... H04L 12/40045; H04L 2012/40215; H04L 2012/40273; B60R 16/02; B60R 16/023; H04W 4/48
See application file for complete search history.

(56) References Cited

U.S. PATENT DOCUMENTS

| | | | | |
|---|---|---|---|---|
| 11,128,650 | B2* | 9/2021 | Hartkopp | ............... G07C 5/008 |
| 2010/0114403 | A1* | 5/2010 | Isoyama | ........... H04L 12/40006 |
| | | | | 701/1 |
| 2017/0013006 | A1 | 1/2017 | Ujiie et al. | |
| 2019/0173912 | A1* | 6/2019 | Ujiie | ................. H04L 12/40026 |
| 2019/0332823 | A1* | 10/2019 | Kwon | ................... G06F 21/554 |
| 2019/0379683 | A1* | 12/2019 | Overby | ............... H04W 12/122 |
| 2021/0004725 | A1* | 1/2021 | Ahmed | ............... H04L 63/0876 |
| 2021/0044610 | A1* | 2/2021 | Kishikawa | .............. H04L 12/40 |
| 2021/0226872 | A1* | 7/2021 | Ujiie | ..................... H04W 12/61 |
| 2021/0226966 | A1* | 7/2021 | Kishikawa | ........ H04L 12/40104 |
| 2021/0226973 | A1* | 7/2021 | Hirano | ................... G07C 5/008 |
| 2022/0070758 | A1* | 3/2022 | Bonnah | ................... H04L 47/70 |

FOREIGN PATENT DOCUMENTS

| | | | | |
|---|---|---|---|---|
| DE | 112012006879 | T5 * | 5/2015 | .......... G06F 11/1441 |
| EP | 3 133 774 | | 2/2017 | |
| EP | 3968602 | A1 * | 3/2022 | ............. H04L 67/12 |
| JP | 2016-64705 | | 4/2016 | |
| JP | 2020028121 | A * | 2/2020 | ............ B60W 20/10 |
| JP | 2021141406 | A * | 9/2021 | ............... H04B 3/36 |
| KR | 20140061043 | A * | 5/2014 | ............. H04L 29/02 |
| KR | 20210119162 | A * | 10/2021 | ............. H04L 12/24 |
| WO | 2015/151418 | | 10/2015 | |
| WO | WO-2018104929 | A1 * | 6/2018 | .......... G05B 19/042 |
| WO | WO-2019193786 | A1 * | 10/2019 | ........... B60R 16/023 |
| WO | WO-2020162075 | A1 * | 8/2020 | ....... H04L 12/40032 |
| WO | WO-2020246989 | A1 * | 12/2020 | ......... H04L 63/0435 |
| WO | WO-2021095513 | A1 * | 5/2021 | ............. H04L 12/40 |
| WO | WO-2021131824 | A1 * | 7/2021 | ........... B60R 16/023 |

OTHER PUBLICATIONS

International Search Report (ISR) issued on May 28, 2019 in International (PCT) Application No. PCT/JP2019/017033.
Kiyotaka Atsumi, et al., "Smart CAN cable, Another proposal of intrusion prevention system (IPS) for in-vehicle networks", 2018 Symposium on Cryptography and Information Security, The Institute of Electronics, Information and Communication Engineers, Jan. 2018, pp. 1-4.
Jun Yajima, et al., "Security CAN Adaptor which enables Detection of Attacks that send aperiodicity Messages", 2016 Symposium on Cryptography and Information Security, The Institute of Electronics, Information and Communication Engineers, Jan. 2016, pp. 1-6, with English translation.

* cited by examiner

FIG. 2

| SOF | ID FIELD | RTR | IDE | r | DLC | DATA FIELD | CRC | DEL | ACK | DEL | EOF |

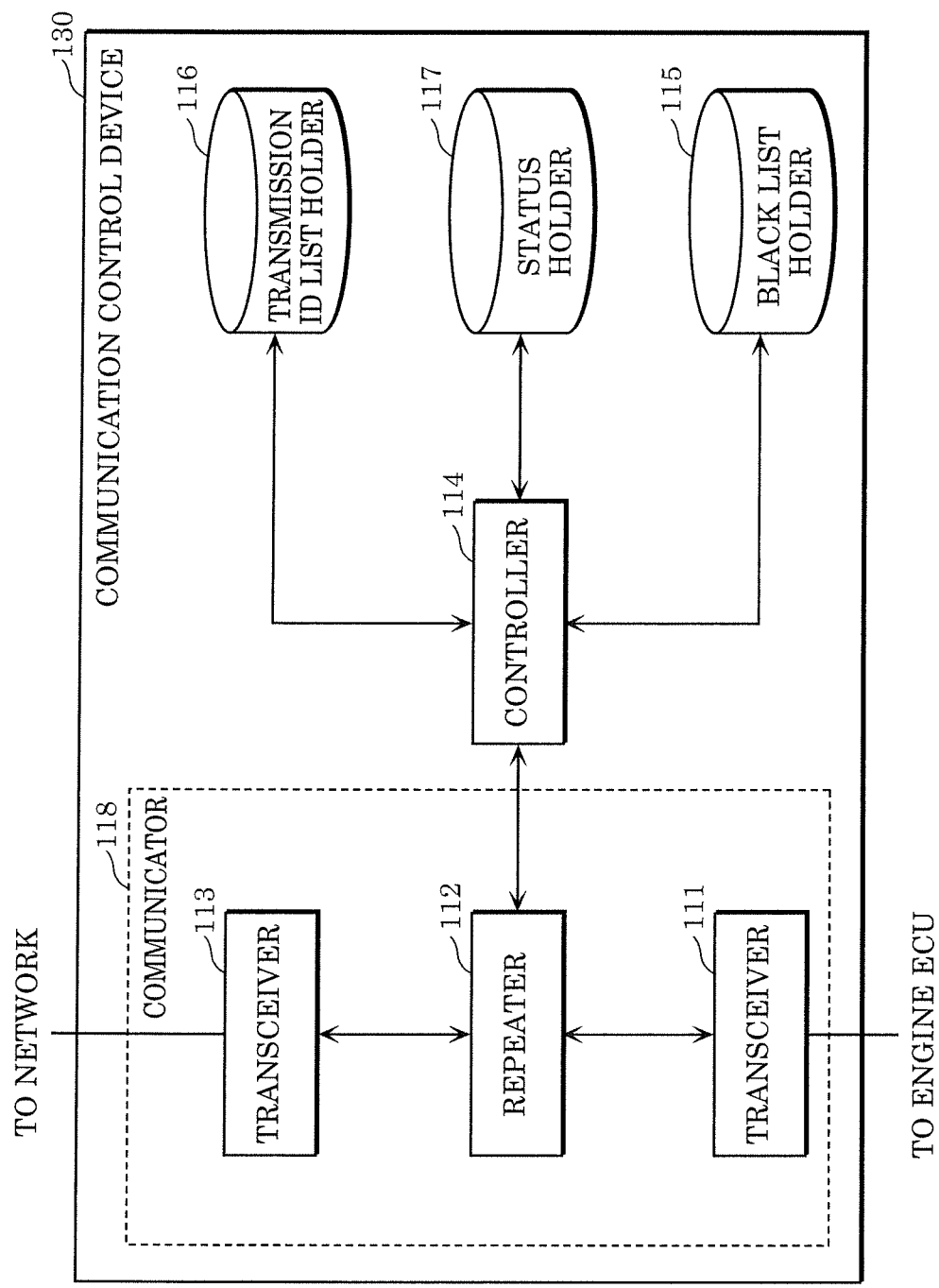

FIG. 7

| BLACK LIST ID |
|---|
| 0x01, 0x02, 0x03, 0x04, 0x05, 0x06, 0x07, 0x08, 0x09, 0x0A, 0x0B, 0x0C, 0x0D, 0x0E, 0x0F |

FIG. 8

| TRANSMISSION ID LIST | HASH VALUE (IN HEXADECIMAL) |
|---|---|
| 0x100<br>0x110<br>0x120<br>0x130<br>0x140 | 60 CD 11 40 D5 D0 63 64 |

FIG. 9

| STATUS |
|---|
| NORMAL<br>(COMMUNICATION AVAILABLE) |

FIG. 10

| ID LIST | HASH VALUE |
|---|---|
| 0x100, 0x110, 0x120, 0x130, 0x140 | 60 CD 11 40 D5 D0 63 64 |
| 0x200, 0x210, 0x220, 0x230 | C9 3F 55 27 C1 22 B3 4F |
| ... | ... |
| 0x550, 0x551, 0x552 | E2 42 EE 4F 0A 67 5A 1B |

COMMUNICATION CONTROL DEVICE, ANOMALY DETECTION ELECTRONIC CONTROL UNIT, MOBILITY NETWORK SYSTEM, COMMUNICATION CONTROL METHOD, ANOMALY DETECTION METHOD, AND RECORDING MEDIUM

CROSS REFERENCE TO RELATED APPLICATIONS

This application is a U.S. continuation application of PCT International Patent Application Number PCT/JP2019/017033 filed on Apr. 22, 2019, claiming the benefit of priority of Japanese Patent Application Number 2018-098984 filed on May 23, 2018, the entire contents of which are hereby incorporated by reference.

BACKGROUND

1. Technical Field

The present disclosure relates to a communication control device and so forth to be used in a mobility network system.

2. Description of the Related Art

In recent years, a system installed in an automobile includes multiple devices called "electronic control units (hereinafter, also referred to as ECUs)". A network that connects these ECUs is called an in-vehicle network. Many standards have been developed for such an in-vehicle network. One of the most leading standards used for in-vehicle networks is a Controller Area Network (hereinafter, referred to as the "CAN").

Security features of the CAN are not designed for the case where an anomalous data frame (message) is transmitted to the network. Thus, an attacker may be able to arbitrarily connect an anomalous node to a network of the CAN, for example. Then, this anomalous node may be able to transmit an anomalous data frame to falsely control a vehicle.

To address this issue, Smart CAN cable, Another proposal of intrusion prevention system (IPS) for in-vehicle networks—LAC Co., Ltd., Symposium on Cryptography and Information Security, 2018 (hereinafter, referred to as NPL 1) discloses a method of disconnecting, after an anomalous data frame is detected from among data frames transmitted to an in-vehicle network, an ECU that transmitted the anomalous data frame.

SUMMARY

Unfortunately, if a normal data frame is detected mistakenly as an anomalous data frame, the method disclosed in NPL 1 may mistakenly disconnect a normal ECU. If the normal ECU is disconnected even mistakenly, the automobile does not function normally. This may affect the safety of the automobile.

In view of this, the present disclosure provides a communication control device and so forth that are capable of accurately detecting an anomalous ECU.

In order to achieve the above-described object, in accordance with an aspect of the present disclosure, there is provided a communication control device that is included in a mobility network system including one or more electronic control units and a network, the communication control device connecting an electronic control unit of the one or more electronic control units to the network, the communication control device, comprising: a communicator that receives a message from the electronic control unit and transmits the message to the network, and receives a message from the network and transmits the message to the electronic control unit; a transmission identification (ID) list holder that holds a transmission ID list including a transmission ID included in the message transmitted from the electronic control unit; and a controller that controls the communicator and the transmission ID list holder, wherein when the transmission ID included in the message transmitted from the electronic control unit is not in the transmission ID list, the controller adds the transmission ID to the transmission ID list and transmits an ID information item related to the transmission ID list to the network.

General or specific aspects of the present disclosure may be implemented to a system, a method, an integrated circuit, a computer program, a computer-readable recording medium such as a Compact Disc-Read Only Memory (CD-ROM), or any given combination thereof.

With the present disclosure, an anomalous ECU can be detected accurately.

BRIEF DESCRIPTION OF DRAWINGS

These and other objects, advantages and features of the disclosure will become apparent from the following description thereof taken in conjunction with the accompanying drawings that illustrate a specific embodiment of the present disclosure.

FIG. 2 illustrates a format of a data frame under a CAN protocol, according to Embodiment 1.

FIG. 4A illustrates a configuration of a communication control device, according to Embodiment 1.

FIG. 7 illustrates an example of a black list, according to Embodiment 1.

FIG. 8 illustrates an example of a transmission ID list, according to Embodiment 1.

FIG. 9 illustrates an example of a status of the communication control device, according to Embodiment 1.

FIG. 10 illustrates an example of normal transmission ID lists stored in a normal ID list holder, according to Embodiment 1.

DETAILED DESCRIPTION OF THE EMBODIMENTS

Figure 1:
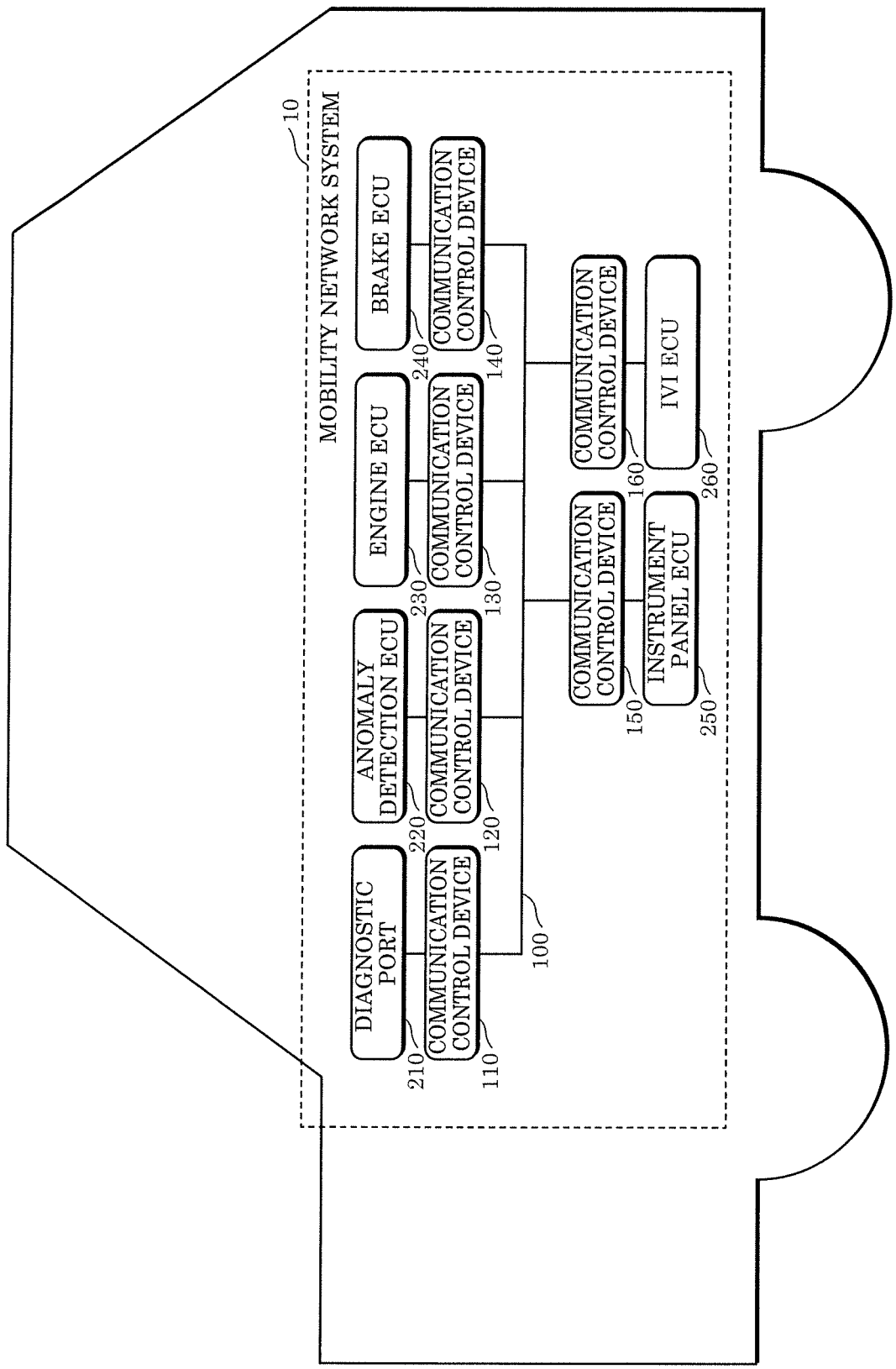
FIG. 1 illustrates an overall configuration of a mobility network system, according to Embodiment 1.

In accordance with an aspect of the present disclosure, there is provided a communication control device that is included in a mobility network system including one or more electronic control units and a network, the communication control device connecting an electronic control unit of the one or more electronic control units to the network, the communication control device, comprising: a communicator that receives a message from the electronic control unit and transmits the message to the network, and receives a message from the network and transmits the message to the electronic control unit; a transmission identification (ID) list holder that holds a transmission ID list including a transmission ID included in the message transmitted from the electronic control unit; and a controller that controls the communicator and the transmission ID list holder, wherein when the transmission ID included in the message transmitted from the electronic control unit is not in the transmission ID list, the controller adds the transmission ID to the transmission ID list and transmits an ID information item related to the transmission ID list to the network.

The communication control device adds the transmission ID included in the message received from the ECU connected to the network via the communication control device (the ECU connected to the communication control device) into the transmission ID list. Then, the communication control device periodically transmits the information related to the transmission ID list to the network. For instance, suppose that an anomaly detection ECU that previously stores information related to a normal transmission ID list related to the message transmitted from the ECU is provided on the network. With this, if the ECU is falsely reprogrammed for example and transmits an anomalous message to the network, the communication control device transmits the information related to the transmission ID list to the network.

The anomaly detection ECU receives the information related to the transmission ID list that is transmitted from the communication control device and may include an anomalous transmission ID. Then, the anomaly detection ECU verifies the information related to the transmission ID list against the normal transmission ID list to detect an anomaly. This enables anomaly detection to be performed for each ECU on the basis of the corresponding transmission ID list of the ECU. Thus, an anomalous ECU can be detected accurately. As a result, only an anomalous ECU can be disconnected without mistakenly determining a normal ECU as an anomalous ECU. This leads to enhancement of the safety of the mobility network system.

It is possible that, when the communicator receives, from the network, a message including a predetermined identifier indicating a request for the ID information item, the controller transmits the ID information item to the network.

Thus, the information related to the transmission ID list can be transmitted according to the request from the outside. This reduces effects on network traffic at a normal time.

It is further possible that after the controller adds the transmission ID to the transmission ID list, the controller transmits the ID information item to the network.

Thus, the information related to the transmission ID list is transmitted after the transmission ID list is updated. This reduces effects on network traffic.

It is still further possible that the controller further counts a total number of messages transmitted from the electronic control unit and transmits a total-number information item related to the total number of messages to the network.

With the information related to the number of messages transmitted from the ECU connected to the communication control device in addition to the information related to the transmission ID list, an anomaly can be detected in view of the numbers of messages. Thus, an anomalous ECU can be detected more accurately.

It is still further possible that the ID information item is the transmission ID list. For example, it is possible that when the communicator receives, from the network, an anomaly notification message indicating an anomalous transmission ID list and the anomalous transmission ID list matches the transmission ID list held in the transmission ID list holder, the controller does not transmit to the network, a message including an anomalous transmission ID that is transmitted from the electronic control unit, from then on.

With this, the anomaly detection ECU provided on the network can find a specific anomalous transmission ID using the transmission ID list as the information related to the transmission ID list received from the network. Then, the anomaly detection ECU can request the communication control device to stop transmission of only the message having the anomalous transmission ID. This enhances the safety.

It is still further possible that when the communicator receives, from the network, an anomaly notification message indicating an anomalous ID information item related to the anomalous transmission ID list and the anomalous ID information item matches the ID information item held in the transmission ID list holder, the controller does not transmit, to the network, a message transmitted from the electronic control unit, from then on.

This enables the communication control device to disconnect the anomalous ECU from the network. Moreover, this also reduces effects of the anomalous ECU on the mobility network system.

In accordance with another aspect of the present disclosure, there is provided an anomaly detection electronic control unit that detects an anomalous electronic control unit of one or more electronic control units in a mobility network system, the mobility network system including the one or more electronic control units and a network, the anomaly detection electronic control unit comprising: a transceiver that transmits a message to the network and receives a message from the network; a normal ID list holder that holds one or more normal ID information items each of which is related to a normal transmission ID list including a transmission ID included in a normal message to be transmitted from a corresponding one of the one or more electronic control units; and an anomaly detector that controls the transceiver and the normal ID list holder, wherein when the transceiver receives, from the network, an ID information item related to a transmission ID list including a transmission ID included in a message transmitted from an electronic control unit of the one or more electronic control units, the anomaly detector determines whether or not the ID information item matches any of the one or more normal ID information items, and when the ID information item does not match any of the one or more normal ID information items, the anomaly detector adds the ID information item into an anomaly notification message indicating an anomalous ID information item related to an anomalous transmission ID list, and transmits the anomaly notification message to the network.

The anomaly detection electronic control unit previously stores the information related to the normal transmission ID list related to the message transmitted from the ECU provided on the network. With this, the anomaly detection electronic control unit can verify the information related to the transmission ID list received from the network and including an anomalous transmission ID against the information related to the normal transmission ID list. As a result, an anomalous ECU can be detected accurately. This leads to enhancement of the safety of the mobility network system.

In accordance with still another aspect of the present disclosure, there is provided A mobility network system that includes one or more electronic control units and a network, the mobility network system comprising: one or more communication control devices that connect the one or more electronic control units to the network; and an anomaly detection electronic control unit that detects an anomalous electronic control unit of the one or more electronic control units, wherein each of the one or more communication control devices includes: a communicator that receives a message from an electronic control unit connected to the communication control device of the one or more electronic control units and transmits the message to the network, and receives a message from the network and transmits the message to the electronic control unit; a transmission ID list holder that holds a transmission ID list including a transmission ID included in the message transmitted from the electronic control unit; and a controller that controls the communicator and the transmission ID list holder, when the transmission ID included in the message transmitted from the electronic control unit is not in the transmission ID list, the controller adds the transmission ID to the transmission ID list and transmits an ID information item related to the transmission ID list to the network, the anomaly detection electronic control unit includes: a transceiver that transmits a message to the network and receives a message from the network; a normal ID list holder that holds one or more normal ID information items each of which is related to a normal transmission ID list including a transmission ID included in a normal message to be transmitted from a corresponding one of the one or more electronic control units; and an anomaly detector that controls the transceiver and the normal ID list holder, when the transceiver receives the ID information item from the network, the anomaly detector determines whether or not the ID information item matches any one of the one or more normal ID information items, and when the ID information item matches any one of the one or more normal ID information items, the anomaly detector adds the ID information item into an anomaly notification message indicating an anomalous ID information item related to an anomalous transmission ID list, and transmits the anomaly notification message to the network.

Thus, the mobility network system capable of accurately detecting an anomalous ECU is provided.

In accordance with still another aspect of the present disclosure, there is provided a communication control method that is executed by a communication control device in a mobility network system including, the mobility network system including one or more electronic control units and a network, the communication control device connecting the one or more electronic control units to the network, the communication control device comprising: a communicator that receives a message from an electronic control unit of the one or more electronic control units and transmits the message to the network, and receives a message from the network and transmits the message to the electronic control unit; and a transmission ID list holder that holds a transmission ID list including a transmission ID included in the message transmitted from the electronic control unit, the communication control method comprising: adding the transmission ID included in the message transmitted from the electronic control unit to the transmission ID list when the transmission ID is not in the transmission ID list; and transmitting an ID information item related to the transmission ID list to the network.

Thus, the communication control method by which an anomalous ECU can be accurately detected is provided.

In accordance with still another aspect of the present disclosure, there is provided a non-transitory computer-readable recording medium embodied with a program that causes a computer to execute the communication control method in accordance with the aspect of the present disclosure.

Thus, the recording medium embodied with the program with which an anomalous ECU can be accurately detected is provided.

In accordance with still another aspect of the present disclosure, there is provided an anomaly detection method executed by an anomaly detection electronic control unit, the anomaly detection electronic control unit detecting an anomalous electronic control unit from one or more electronic control units in a mobility network system, the mobility network system including the one or more electronic control units and a network, the anomaly detection electronic control unit including: a transceiver that transmits a message to the network and receives a message from the network; and a normal ID list holder that holds one or more normal ID information items each of which is related to a normal transmission ID list including a transmission ID included in a normal message to be transmitted from a corresponding one of the one or more electronic control units, the anomaly detection method comprising: when the transceiver receives, from the network, an ID information item related to a transmission ID list including a transmission ID included in a message transmitted from an electronic control unit of the one or more electronic control units, determines whether or not the ID information item matches the one or more normal ID information items, and adding the ID information item into an anomaly notification message and transmitting the anomaly notification message to the network, when the ID information item matches any of the one or more normal ID information items, the anomaly notification message indicating an anomalous ID information related to an anomalous transmission ID list.

Thus, the communication control method by which an anomalous ECU can be accurately detected is provided.

In accordance with still another aspect of the present disclosure, there is provided a non-transitory computer-readable recording medium embodied with a program that causes a computer to execute the anomaly detection method in accordance with the still another aspect of the present disclosure.

Thus, the recording medium embodied with the program with which an anomalous ECU can be accurately detected is provided.

Hereinafter, the mobility network system according to embodiments of the present disclosure will be described in detail with reference to the accompanying Drawings. The following embodiments are general and specific examples of the present disclosure. The numerical values, shapes, materials, constituent elements, arrangement and connection configuration of the constituent elements, steps, the order of the steps, etc., described in the following embodiments are merely examples, and are not intended to limit the present disclosure. Among constituent elements in the following embodiments, those not described in any one of the independent claims indicating the broadest concept of the present disclosure are described as optional constituent elements.

Embodiment 1

The following describes an anomaly detection ECU and a communication control device that are included in a mobility network system (such as an in-vehicle network system) in which a plurality of ECUs communicate with each other via a CAN network.

[1.1 Overall Configuration of Mobility Network System]

FIG. 1 illustrates an overall configuration of mobility network system 10, according to the present embodiment. As illustrated in FIG. 1, mobility network system 10 is installed in, for example, a vehicle (such as an automobile). In FIG. 1, mobility network system 10 includes network 100 and one or more ECUs. The ECUs includes communication control devices 110, 120, 130, 140, 150, and 160, diagnostic port 210, anomaly detection ECU 220, engine ECU 230, brake ECU 240, instrument panel ECU 250, and in-vehicle information (IVI) ECU 260. The example in FIG. 1 shows that mobility network system 10 includes a plurality of communication control devices, each of which establishes a one-to-one connection with a corresponding one of the plurality of ECUs, for example.

Here, description is focused on communication control device 130, for example. Communication control device 130 is disposed between network 100 and one of the ECUs (engine ECU 230 in this case). Engine ECU 230 transmits a message to network 100 and receives a message from network 100, via communication control device 130. Hereinafter, a message is also referred to as a data frame.

Each of the ECUs is a device that includes a processor, a digital circuit like a memory, an analog circuit, and a communication circuit, for example. The memory includes a read only memory (ROM) and a random access memory (RAM), and is capable of storing a program to be executed by the processor. For example, the processor operates according to the program, so that the ECU achieves various functions. The ECU transmits and receives data frames via a network in a mobility network under a CAN protocol, for example.

Each of the ECUs transmits and receives data frames based on the CAN protocol, to and from the network. For example, the ECU receives, from the network, a data frame transmitted from another ECU. Moreover, the ECU generates a data frame including contents to be transmitted to another ECU and transmits the generated data frame to the network. To be more specific, the ECU performs a process in response to contents of the received data frame. The ECU also generates a data frame indicating a status of a device or sensor connected to the ECU or indicating an instruction value (control value) to be given to another ECU, and then transmits the generated data frame to the network.

Diagnostic port 210 is connected to communication control device 110 and achieves communication via network 100. Diagnostic port 210 is a port typically called an on-board diagnostic (OBD) port. Diagnostic port 210 is connected to a dedicated terminal owned by a dealer and performs, for example, failure diagnosis on an ECU connected to network 100.

Anomaly detection ECU 220 is connected to communication control device 120 and achieves communication via network 100. Anomaly detection ECU 220 monitors network 100 and verifies whether an anomalous data frame is transmitted or an anomalous ECU is connected. For example, anomaly detection ECU 220 is an intrusion detection system (IDS) ECU.

Engine ECU 230 is connected to communication control device 130 and achieves communication via network 100. Engine ECU 230 controls a rotational speed of an engine, on the basis of information obtained from network 100. The engine connected to engine 230 is omitted from FIG. 1.

Brake ECU 240 is connected to communication control device 140 and achieves communication via network 100. Brake ECU 240 controls a brake, on the basis of information obtained from network 100. The brake connected to brake ECU 240 is omitted from FIG. 1.

Instrument panel ECU 250 is connected to communication control device 150 and achieves communication via network 100. Instrument panel ECU 250 controls display of an instrument panel, on the basis information obtained from network 100. The instrument panel connected to instrument panel ECU 250 is omitted from FIG. 1.

IVI ECU 260 is connected to communication control device 160 and achieves communication via network 100. IVI ECU 260 is connected to in-vehicle information and entertainment terminals, or more specifically, a car navigation system (car-navi) and an audio head unit, for example. IVI ECU 260 controls these terminals. IVI ECU 260 is connected to an external server, which is not shown, via a dedicated line and has functions, such as updating map information and applications. The car-navi and the audio head unit are omitted from FIG. 1.

The communication control devices are described in detail later.

Note that the plurality of ECUs included in mobility network system 10 may include an ECU that is connected to network 100 without involving a communication control device. For example, an anomaly detection device may be connected only between network 100 and an ECU related to vehicle driving control that is likely to substantially affect the safety of the vehicle. With this, cost can be reduced.

[1.2 Data Frame Format]

FIG. 2 illustrates a format of a data frame under the CAN protocol, according to the present embodiment. FIG. 2 illustrates a data frame in a standard ID format under the CAN protocol.

As illustrated in FIG. 2, the data frame includes: a Start Of Frame (SOF); an ID field; a Remote Transmission Request (RTR); an IDentifier Extension (IDE); a reserved bit (r); a data length code (DLC); a data field; a Cyclic Redundancy Check (CRC) sequence; a CRC delimiter (DEL); an Acknowledgement slot (ACK); an ACK delimiter (DEL); and an End of Frame (EOF).

The SOF is a 1-bit dominant. The SOF is recessive while network 100 is in an idle state. A recessive-to-dominant transition of the SOF provides notification of the start of frame transmission.

The ID field has an 11-bit length to store an ID value representing a data type. If a plurality of nodes start transmission at the same time, communication arbitration is performed using this ID field. A data frame having a smaller value as the ID is designed to have higher priority.

The RTR is a 1-bit dominant indicating that this is a data frame.

Each of the IDE and the r is a 1-bit dominant.

The DLC is a 4-bit value indicating a length of the data field.

The data field has up to 64 bits representing contents of the data to be transmitted. The length of the data field is adjustable in unit of 8 bits. Specifications for the data to be transmitted depend on the type or manufacturer of the vehicle.

The CRC sequence has a 15-bit length. The CRC sequence is calculated from transmission values of the SOF, the ID field, the control field, and the data field.

The CRC delimiter is a 1-bit recessive and indicates an end of the CRC sequence.

The ACK has a 1-bit length. A transmission node transmits a recessive from this slot. A reception node transmits a dominant if the fields from the beginning to the CRC sequence have been normally received. Here, a dominant state is prioritized.

The ACK delimiter is a 1-bit recessive and indicates an end of the ACK slot.

The EOF is a 7-bit recessive and indicates an end of the data frame.

[1.3 Error Frame Format]

Figure 3:
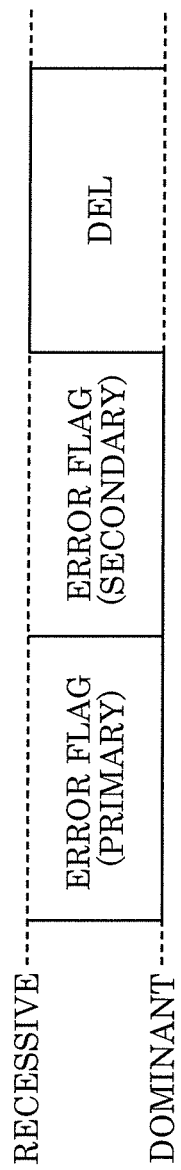
FIG. 3 illustrates a format of an error frame under the CAN protocol, according to Embodiment 1.

FIG. 3 illustrates a format of an error frame under the CAN protocol, according to the present embodiment. An error frame includes an error flag (primary), an error flag (secondary), and an error delimiter (DEL).

The error flag (primary) is used to notify the other nodes indicating that an error has occurred. For this notification, six consecutive dominant bits are transmitted, which violates the rule of bit stuffing (under which six or more consecutive bits of the same value should not be transmitted). This causes the other nodes to transmit an error frame (secondary).

With the error frame (secondary), six consecutive dominant bits are transmitted to notify the other nodes indicating that an error occurred. Each of the nodes that receives the error flag (primary) transmits the error flag (secondary).

The error delimiter (DEL) is eight consecutive recessive bits transmitted to denote an end of the error frame.

[1.4 Configuration of Communication Control Device]

Next, a configuration of the communication control device is described. Communication control device 130 is mainly described here.

FIG. 4A illustrates a configuration of communication control device 130, according to the present embodiment. Each of communication control devices 110, 120, 140, 150, and 160 has the same configuration as communication control device 130, and thus description on these other communication control devices is omitted.

In FIG. 4A, communication control device 130 includes communicator 118, controller 114, black list holder 115, transmission ID list holder 116, and status holder 117. Communication control device 130 includes a processor, a digital circuit like a memory, an analog circuit, and a communication circuit, for example. The memory includes a ROM and a RAM, and is capable of storing a program to be executed by the processor. For example, the processor operates according to the program, so that communication control device 130 implements controller 114. Communicator 118 is implemented by a communication circuit, for example. Each of black list holder 115, transmission ID list holder 116, and status holder 117 is implemented by a memory, for example.

Communicator 118 receives a data frame from engine ECU 230 and then transmits the received data frame to network 100. Moreover, communicator 118 receives a data frame from network 100 and then transmits the received data frame to engine ECU 230. To be more specific, communicator 118 includes transceiver 111, repeater 112, and transceiver 113.

Transceiver 111 receives a data frame transmitted from engine 230 and then provides notification to repeater 112 by outputting a binary digital signal having digits 0 and 1. Moreover, transceiver 111 transmits, to engine ECU 230, a data frame notified by repeater 112.

Transceiver 113 transmits, to network 100, a data frame notified by repeater 112. Moreover, transceiver 113 notifies, to repeater 112, a data frame received from network 100.

Repeater 112 notifies, to controller 114, the data frame received from transceiver 111. If controller 114 determines that the data frame received from transceiver 111 is allowed to be transmitted, repeater 112 notifies transceiver 113 of this data frame. Moreover, repeater 112 notifies controller 114 and transceiver 111 of the data frame received from transceiver 113.

Black list holder 115 stores a black list of IDs included in data frames that are prohibited from being transmitted from communication control device 130. Black list holder 115 is described in detail later.

Transmission ID list holder 116 stores a transmission ID list of transmission IDs included in data frames that are transmitted from engine ECU 230 connected to communication control device 130. Transmission ID list holder 116 is described in detail later.

Status holder 117 holds information indicating a status of communication control device 130. Status holder 117 is described in detail later.

Controller 114 controls communicator 118 (repeater 112), black list holder 115, transmission ID list holder 116, and status holder 117. Controller 114 performs a process as follows.

Controller 114 determines whether a transmission ID included in the data frame notified by transceiver 111 is stored in black list holder 115. If the transmission ID included in the data frame received from transceiver 111 is stored in black list holder 115, controller 114 instructs repeater 112 not to notify transceiver 113 of the data frame received from transceiver 111.

Moreover, when the status of communication control device 110 stored in status holder 117 is a "transmission stop" status, controller 114 instructs repeater 112 not to notify transceiver 113 of the data frame received from transceiver 111.

If the transmission ID included in the data frame transmitted from engine ECU 230 is not stored in the transmission ID list, controller 114 adds this transmission ID to the transmission ID list. Controller 114 calculates information (such as a hash value) related to the transmission ID list at predetermined time intervals using, for example, the transmission ID list held in transmission ID list holder 116. Then, controller 114 stores this information into transmission ID list holder 116. In addition, controller 114 includes the hash value and a device ID predetermined for each communication control device into a data frame, and instructs repeater 112 to notify transceiver 113 of this data frame (or more specifically, transmits the information related to the transmission ID list and so forth to network 100). For example, when communicator 118 receives, from network 100, a data frame including a predetermined identifier indicating a request for the information related to the transmission ID list, controller 114 may transmit the information related to the transmission ID list to network 100. The predetermined identifier is not particularly intended to be limiting, and may be any identifier that indicates a request for the information related to the transmission ID list. For example, when adding the transmission ID to the transmission ID list (at the time of addition), controller 114 may transmit the information related to the transmission ID list to network 100.

Communicator 118 receives an anomaly notification data frame indicating information related to an anomalous transmission ID list from network 100 (or more specifically, from anomaly detection ECU 220). In this case, if the information related to the anomalous transmission ID list matches the information related to the transmission ID list stored in transmission ID list holder 116, controller 114 does not transmit, to network 100, any data frame received from engine ECU 230 from then on. For example, because the anomaly notification data frame includes a predetermined ID (such as an IDS ID) indicating that this data frame is from anomaly detection ECU 220, controller 114 is able to identify that the anomaly notification data frame indicates the information related to the anomalous transmission ID list.

Controller 114 determines whether the information (such as a hash value) related to the transmission ID list included in the anomaly notification data frame matches the information (such as the hash value) related to the transmission ID list stored in transmission ID list holder 116. If the hash value included in the anomaly notification data frame matches the hash value of the transmission ID list stored in transmission ID list holder 116, controller 114 determines that the transmission ID list stored in transmission ID list holder 116 is anomalous. Then, controller 114 stores the status of communication control device 130 as "transmission stop" into status holder 117. Here, when controller 114 "determines that the transmission ID list stored in transmission ID list holder 116 is anomalous", this means that controller 114 "determines that engine ECU 230 connected to communication control device 130 is an anomalous ECU". From then on, because communication control device 130 is in the "transmission stop" status, controller 114 does not transmit, to network 100, a data frame transmitted from engine ECU 230 and including an anomalous transmission ID.

Here, if the anomaly notification data frame notified by transceiver 113 has the IDS ID and includes a value matching the device ID of communication control device 130, controller 114 may determine that the transmission ID list stored in transmission ID list holder 116 is anomalous. Then, controller 114 may store the status of communication control device 130 as "transmission stop" into status holder 117. To be more specific, communication control device 130 determines whether the transmission ID list stored in communication control device 130 is anomalous, using an anomaly notification data frame. In this case, the transmission ID list may be determined to be anomalous if the anomaly notification data frame does not include the hash value of the transmission ID list stored in communication control device 130 or if the anomaly notification data frame does not include the device ID of communication control device 130.

Here, the information related to the transmission ID list is the transmission ID list instead of the hash value, and that communicator 118 receives, from network 100, an anomaly notification message indicating an anomalous transmission ID list. In this case, if this anomalous transmission ID list matches the transmission ID list stored in transmission ID list holder 116, controller 114 may not transmit, to network 100, a data frame transmitted from engine ECU 230 and including an anomalous transmission ID from then on.

[1.5 Different Configuration of Communication Control Device]

Figure 4B:
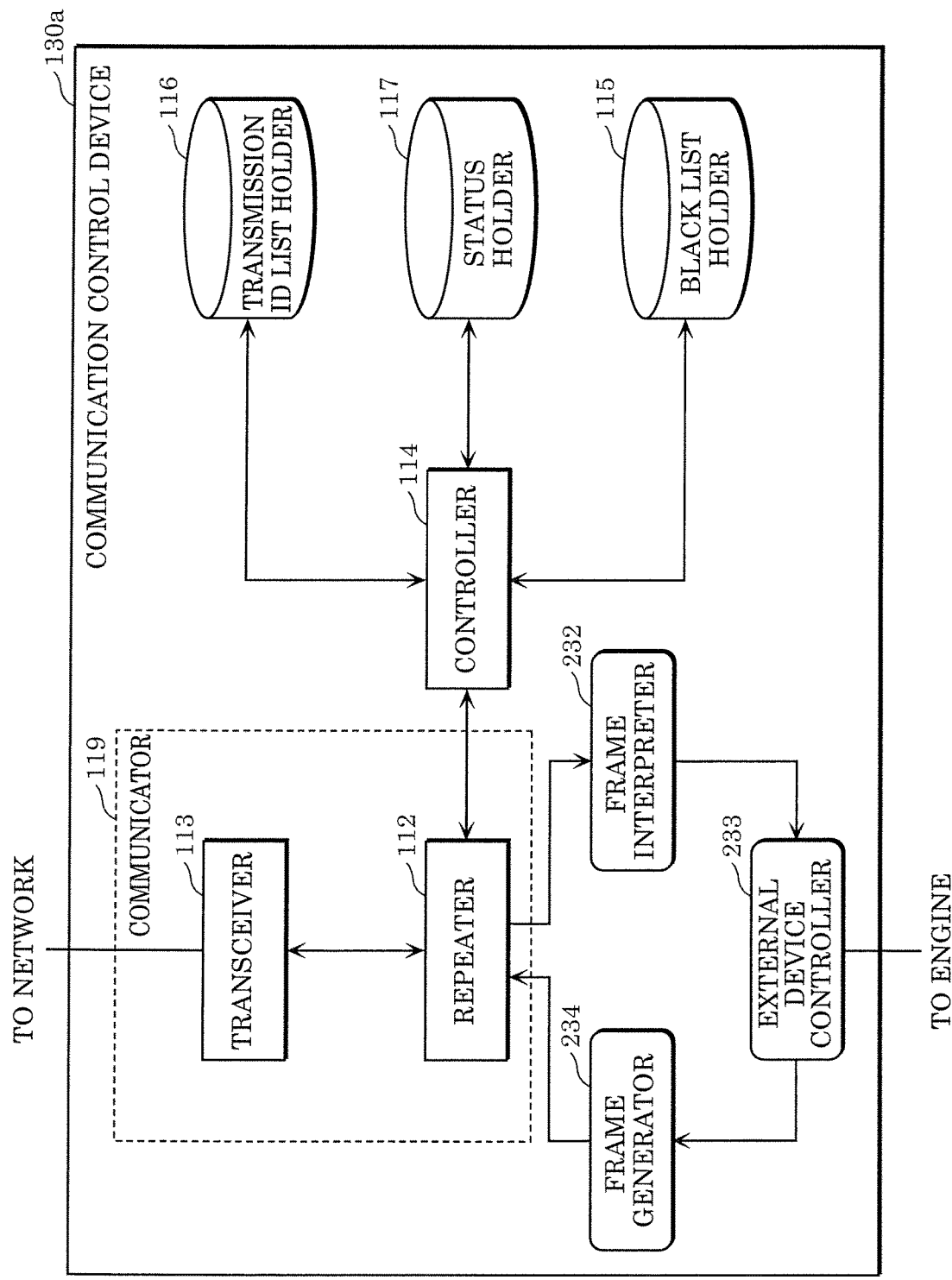
FIG. 4B illustrates a different configuration of the communication control device, according to Embodiment 1.

FIG. 4B illustrates a different configuration of the communication control device, according to the present embodiment. In FIG. 4B, communication control device 130*a* is integrated with engine ECU 230, which is described later. Communication control device 130*a* is different from communication control device 130 in including communicator 119 instead of communicator 118. Moreover, communication control device 130*a* is different from communication control device 130 in including frame interpreter 232, frame generator 234, and external device controller 233, which are parts of engine ECU 230.

Frame interpreter 232, frame generator 234, and external device controller 233, which are the parts of engine ECU 230, are described later.

Communication control device 130*a* does not include transceiver 111 provided for communication control device 130. More specifically, communicator 119 does not include transceiver 111 provided for communicator 118. Repeater 112, transceiver 113, controller 114, black list holder 115, and transmission ID list holder 116 are the same as those included in communication control device 110 described above. Thus, the description on those components is not repeated here.

Communication control device 130 has the configuration in which a data frame is transmitted from a transceiver of engine ECU 230, or more specifically, from frame transceiver 231 described later.

In contrast, instead of transmitting and receiving data frames to and from the transceiver of engine ECU 230, communication control device 130*a* is integrated with frame generator 234 and frame interpreter 232 that are internal CAN controllers of engine ECU 230. This reduces the number of components and thus is effective in lowering the cost of development. In this way, the function of the communication control device may be built in the ECU.

[1.6 Configuration of Anomaly Detection ECU]

Figure 5:
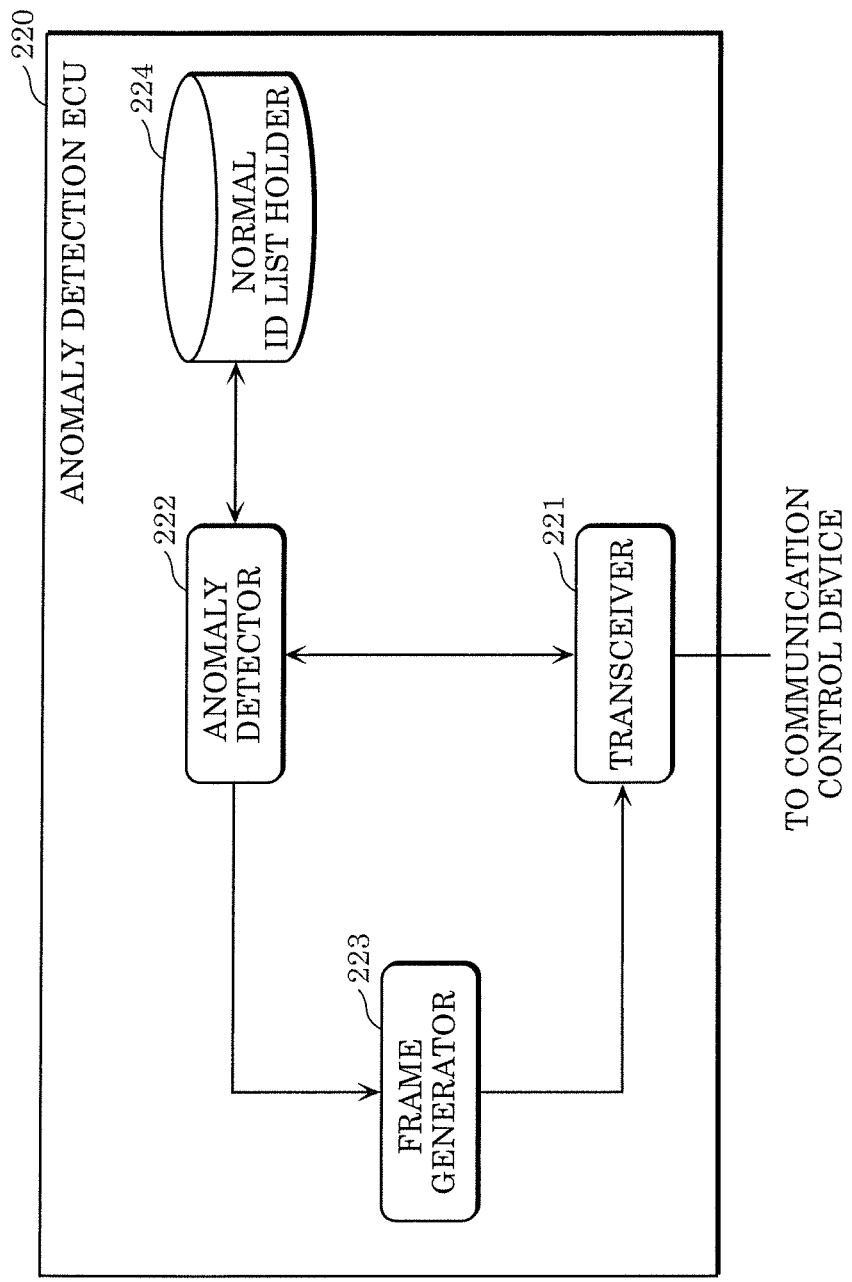
FIG. 5 illustrates a configuration of an anomaly detection ECU, according to Embodiment 1.

Next, a configuration of anomaly detection ECU 220 is described. FIG. 5 illustrates the configuration of anomaly detection ECU 220, according to the present embodiment. Anomaly detection ECU 220 includes transceiver 221, anomaly detector 222, frame generator 223, and normal ID list holder 224. For example, the processor operates according to programs, so that anomaly detection ECU 220 implements anomaly detector 222 and frame generator 223. Transceiver 221 is implemented by a communication circuit, for example. Normal ID list holder 224 is implemented by a memory, for example.

Transceiver 221 transmits and receives data frames to and from network 100. More specifically, transceiver 221 transmits and receives data frames based on the CAN protocol to and from communication control device 120 connected to anomaly detection ECU 220. Thus, transceiver 221 receives a data frame one bit at a time from communication control device 120. After the completion of reception of a data frame without error, transceiver 221 transfers information including an ID, a DLC, and data of the data frame to anomaly detector 222.

If determining that a data frame currently being received from communication control device 120 does not follow the CAN protocol, transceiver 221 transmits an error frame to communication control device 120.

If receiving an error frame from communication control device 120, that is, if interpreting the received data frame as an error frame, transceiver 221 discards this data frame from then on.

If receiving a request for transmission of a data frame from frame generator 223, transceiver 221 transmits the data frame to communication control device 120.

Normal ID list holder 224 holds one or more pieces of information related to normal transmission ID lists each of which includes a transmission ID included in a normal message to be transmitted from one of the one or more ECUs included in mobility network system 10. To be more specific, normal ID list holder 224 holds, for each of the ECUs included in mobility network system 10, a normal transmission ID list of transmission IDs predetermined to be transmitted from the ECU and a hash value of the normal transmission ID list. Normal ID list holder 224 is described in detail later.

Anomaly detector 222 controls transceiver 221 and normal ID list holder 224. Anomaly detector 222 performs a process as follows.

Transceiver 221 receives, from network 100 (or more specifically, from communication control device 120), the information related to the transmission ID list of the transmission ID included in the data frame transmitted from one of the one or more ECUs. In this case, anomaly detector 222 verifies the information related to the transmission ID list against the one or more pieces of information related to the normal transmission ID lists. Then, anomaly detector 222 includes the information related to the transmission ID list that does not match any of the one or more pieces of information related to the normal transmission ID lists, into an anomaly notification message indicating information related to an anomalous transmission ID list. Then, anomaly detector 222 transmits this anomaly notification message to network 100 (or more specifically, to communication control device 120).

To be more specific, anomaly detector 222 determines whether an anomalous ECU is connected to network 100 on the basis of the data frame received from transceiver 221 and the normal transmission ID lists stored in normal ID list holder 224.

A data frame received from transceiver 221 is transmitted from communication control device 110, 130, 140, 150, or 160 and includes the device ID and the hash value of the transmission ID list. Such a data frame has, as a data frame ID, a device ID predetermined for each of communication control devices 110, 130, 140, 150, and 160. Anomaly detector 222 verifies that the data frame received by transceiver 221 includes the hash value of the transmission ID list. After this, anomaly detector 222 verifies whether the hash value of the transmission ID list included in the received data frame matches any of the hash values of one or more normal transmission ID lists stored in normal ID list holder 224.

If the hash value of the transmission ID list included in the received data frame does not match any of the hash values of the normal transmission ID lists stored in normal ID list holder 224, anomaly detector 222 determines that the ECU connected to the communication control device that transmitted this hash value of the transmission ID list transmitted the data frame including an anomalous transmission ID. More specifically, anomaly detector 222 detects that this ECU is anomalous.

If detecting an anomalous ECU, anomaly detector 222 notifies frame generator 223 of a request for transmission of an anomaly notification data frame to transmit a disconnection request message to the communication control device connected to this anomalous ECU. This mitigates the adverse effect of an attack by the anomalous ECU.

When receiving, from anomaly detector 222, the notification of the request to disconnect the anomalous ECU, frame generator 223 generates an anomaly notification data frame including the hash value of the anomalous transmission ID list or the device ID of the device that transmitted the hash value of the anomalous transmission ID list. Then, frame generator 223 transmits a transmission request to transceiver 221.

[1.7. Configuration of Engine ECU]

Next, a configuration of the ECU is described. A configuration of engine ECU 230 connected to communication control device 130 is mainly described here. Brake ECU 240, instrument panel ECU 250, and IVI ECU 260, for example, also have the same configuration as engine ECU 230, and thus description on these ECUs is omitted.

Figure 6:
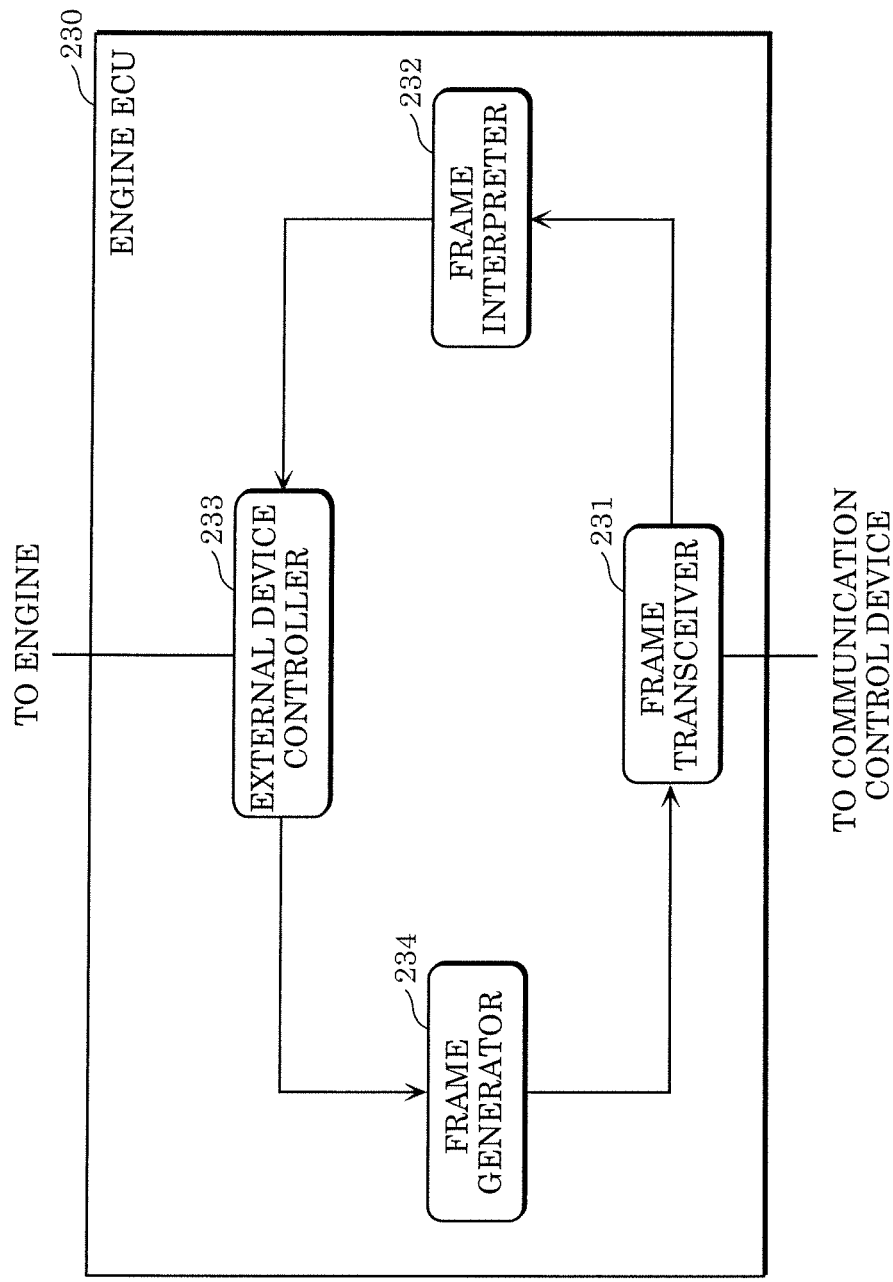
FIG. 6 illustrates a configuration of an engine ECU, according to Embodiment 1.

FIG. 6 illustrates the configuration of engine ECU 230, according to the present embodiment. Engine ECU 230 includes frame transceiver 231, frame interpreter 232, external device controller 233, and frame generator 234.

Frame transceiver 231 transmits and receives data frames based on the CAN protocol to and from communication control device 130. More specifically, frame transceiver 231 receives a data frame one bit at a time from communication control device 130. After the completion of reception of a data frame without error, frame transceiver 231 transfers information including an ID, a DLC, and data of the data frame to frame interpreter 232.

If determining that a data frame currently being received does not follow the CAN protocol, frame transceiver 231 transmits an error frame.

If receiving an error frame, that is, if interpreting the received data frame is an error frame on the basis of a value included in the received data frame, frame transceiver 231 discards this data frame from then on.

If receiving a request for transmission of a data frame from frame generator 234, frame transceiver 231 transmits the data frame to communication control device 130.

Frame interpreter 232 interprets the data frame notified by frame transceiver 231 and determines a process to be performed. For example, if the data frame includes data instructing to directly increase the rotational speed of the engine, frame interpreter 232 instructs external device controller 233 to perform a process to increase the rotational speed of the engine.

External device controller 233 is an interface for controlling an external device connected to engine ECU 230. For engine ECU 230, external device controller 233 is connected to the engine. External device controller 233 notifies frame generator 234 of information related to the current rotational speed of the engine to broadcast this information on network 100 so that the other ECUs are notified of the current rotational speed of the engine.

When receiving control information for the rotational speed of the engine from frame interpreter 232, external device controller 233 controls the rotational speed of the engine as instructed in the control information.

Brake ECU 240, instrument panel ECU 250, and IVI ECU 260 are connected to the brake, the instrument panel, and the navigation system for instance, respectively. Information is obtained from these devices, which are accordingly controlled by the ECUs.

Frame generator 234 generates a data frame indicating, for example, information related to the external device notified by external device controller 233 and a control message based on the information related to the external device to be notified to the other ECUs. Then, frame generator 234 transmits a transmission request to frame transceiver 231 to notify network 100 of the generated data frame.

[1.8 Structure of Black List]

Next, a structure of the black list stored in black list holder 115 of communication control device 130 is described. FIG. 7 illustrates an example of the black list, according to the present embodiment. In FIG. 7, the black list includes black list IDs having transmission IDs of 0x01, 0x02, 0x03, 0x04, 0x05, 0x06, 0x07, 0x08, 0x09, 0x0A, 0x0B, 0x0C, 0x0D, 0x0E, and 0x0F. To be more specific, if a data frame having one of the above IDs is to be transmitted from engine ECU 230 connected to communication control device 130, communication control device 130 does not transmit this data frame to network 100.

The black list may store: the device IDs as the IDs of data frames to be transmitted from the communication control devices; and the IDS ID as the ID of a data frame to be transmitted from anomaly detection ECU 220.

Note that communication control device 130 may not include black list holder 115. For example, the addition of the device ID or IDS ID to a transmission ID list enables anomaly detection ECU 220 to determine whether the transmission ID list is anomalous. On this account, communication control device 130 may not store the black list in the first place. However, up until the determination is made using the transmission ID list, masquerading by communication control device 130 or anomaly detection ECU 220 is allowed to continue unaddressed. Thus, the black list including the device ID or IDS ID may be stored separately from the transmission ID list. These IDs are determined in the manufacturing stages of network 100 and communication control device 130, and thus do not need to be designed depending on the vehicle type. From a security perspective, communication control device 130 including black list holder 115 in this way can prevent transmission of a data frame including a disconnection request from an anomalous ECU and transmission of an anomalous ID list. This enhances the security of mobility network system 10.

[1.9 Structure of Transmission ID List]

Next, the transmission ID list stored in transmission ID list holder 116 of communication control device 130 is described.

FIG. 8 illustrates an example of the transmission ID list, according to the present embodiment. FIG. 8 illustrates the transmission ID list of transmission IDs of 0x100, 0x110, 0x120, 0x130, and 0x140. More specifically, this diagram indicates that engine ECU 230 connected to communication control device 130 has transmitted the data frames having the aforementioned IDs. The hash value of the transmission ID list is "60 CD 11 40 D5 D0 63 64" in hexadecimal notation.

Note that a hash algorithm may be a cryptographic hash algorithm, such as SHA-256. Alternatively, the hash algorithm may use a Bloom filter, a checksum, or a cyclic redundancy check.

Although stored in plain text in FIG. 8, the transmission ID list and the hash value may be stored in encrypted form. Moreover, the hash value may be calculated as needed, and may not be stored in transmission ID list holder 116.

[1.10. Structure of Status of Communication Control Device]

Next, a structure of the status of communication control device 130 that is stored in status holder 117 of communication control device 130 is described.

FIG. 9 illustrates an example of the status of communication control device 130, according to the present embodiment. FIG. 9 illustrates that the status of communication control device 130 is "normal (communication available)". More specifically, this diagram indicates that network 100 and engine ECU 230 are able to communicate with each other.

Communication control device 130 also has the "transmission stop" status, in addition to the "normal (communication available)" status. The "transmission stop" status indicates that an anomalous data frame is being transmitted from engine ECU 230 connected to communication control device 130. In the "transmission stop" status, communication control device 130 stops transmission of a data frame from engine ECU 230.

[1.11 Structure of Normal ID List]

Next, a structure of the normal transmission ID list stored in normal ID list holder 224 of anomaly detection ECU 220 is described.

FIG. 10 illustrates an example of the normal transmission ID lists, according to the present embodiment. Normal ID list holder 224 stores the normal transmission ID list of the data frames transmitted from the ECU. The normal transmission ID list is previously created on the basis of design information on the ECU, and stored in normal ID list holder 224 of anomaly detection ECU 220. In FIG. 10, a first normal transmission ID list includes transmission IDs of 0x100, 0x110, 0x120, 0x130, and 0x140 and thus indicates the presence of the ECU having these transmission IDs in the transmission ID list. The hash value of this list is "60 CD 11 40 D5 D0 63 64". A second transmission ID list includes transmission IDs of 0x200, 0x210, 0x220, and 0x230, and the hash value of this list is "C9 3F 55 27 C1 22 B3 4F". A last transmission ID list includes transmission IDs of 0x550, 0x551, and 0x552, and the hash value of this list is "E2 42 EE 4F 0A 67 5A 1B". Note that the ECU may transmit a data frame at the time of occurrence of an event, depending on the ECU type. Thus, the hash value of the transmission ID list received by anomaly detection ECU 220 from network 100 may be different according to circumstances. For example, the transmission ID list of an ECU may include all of the transmission IDs of 0x550, 0x551, and 0x552 illustrated in FIG. 10 in some case but, according to circumstances, may not include, for example, 0x552 that is to be included in a data frame transmitted at the time of occurrence of an event. For this reason, normal ID list holder 224 may store a plurality of normal transmission ID lists for one ECU. To be more specific, normal ID list holder 224 may store, for one ECU, the normal transmission ID list including the transmission IDs of 0x550, 0x551, and 0x552 and the normal transmission ID list including the transmission IDs of 0x550 and 0x551.

[1.12 Process Performed by Communication Control Device]

Next, a process performed by communication control device 130 is described.

Figure 11:
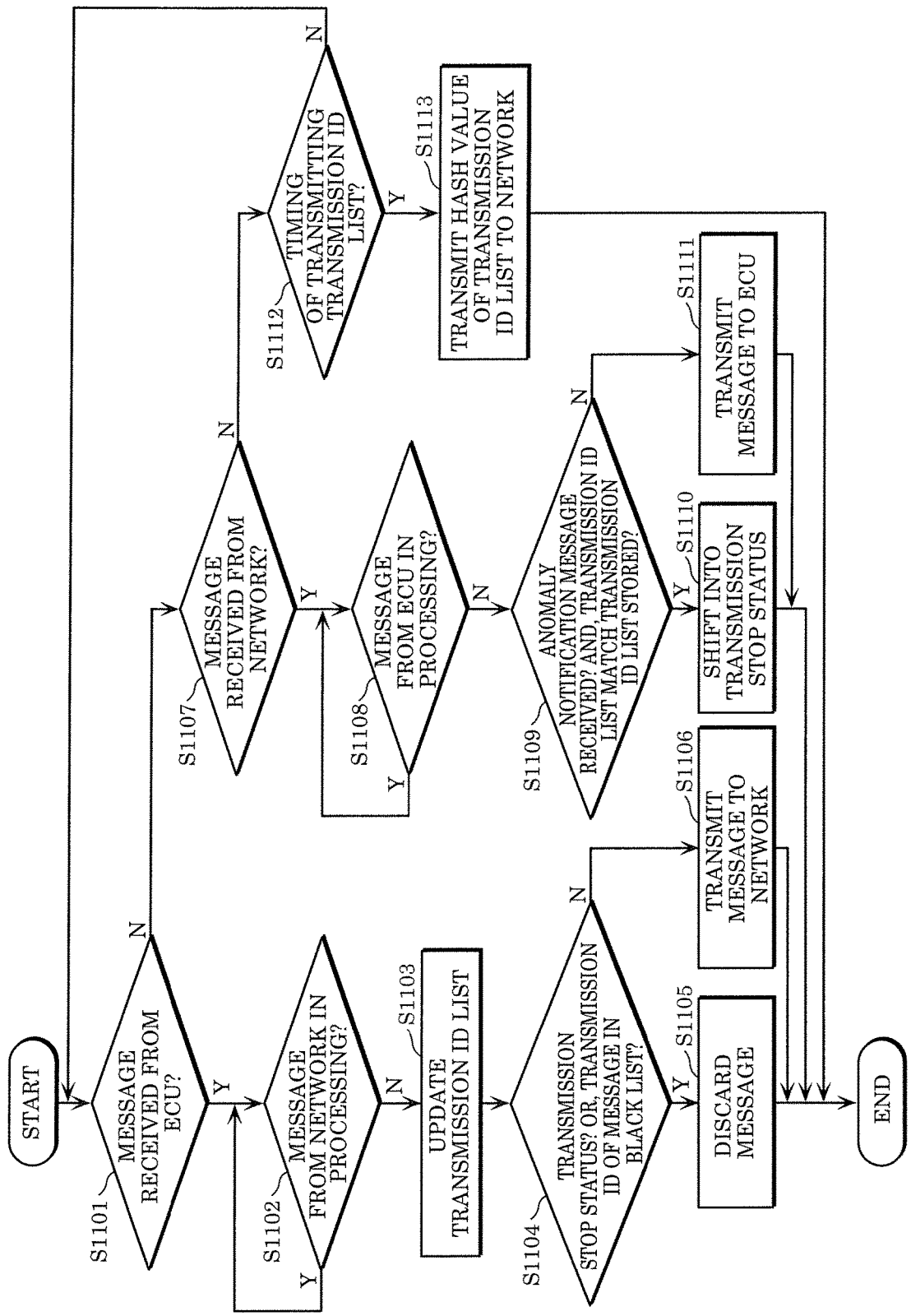
FIG. 11 is a flowchart of a process performed by the communication control device, according to Embodiment 1.

FIG. 11 is a flowchart of the process performed by communication control device 130, according to the present embodiment.

In Step S1101, communication control device 130 determines whether a message (a data frame) has been received from engine ECU 230. If a message has been received from engine ECU 230 (Y in Step S1101), communication control device 130 executes Step S1102. If no message has been received from engine ECU 230 (N in Step S1101), communication control device 130 executes Step S1107.

In Step S1102, communication control device 130 determines whether the message received from network 100 is in processing. If the message from network 100 is in processing (Y in Step S1102), communication control device 130 waits until the process is completed. If the message from network 100 is not in processing (N in Step S1102), communication control device 130 executes Step S1103.

In Step S1103, communication control device 130 updates the transmission ID list stored in transmission ID list holder 116, on the basis of the transmission ID included in the message received from engine ECU 230. To be more specific, if the transmission ID included in the message transmitted from engine ECU 230 is not in the transmission ID list, communication control device 130 adds this transmission ID to the transmission ID list. After this, communication control device 130 executes Step S1104.

In Step S1104, communication control device 130 determines whether the status of communication control device 130 is "transmission stop" or the transmission ID included in the message received from engine ECU 230 is in the black list stored in black list holder 115. Communication control device 130 is in the "transmission stop" status when Step S1110 described later is executed.

If either one of the aforementioned two conditions is satisfied (Y in Step S1104), communication control device 130 discards the message (Step S1105) and ends the process. The "transmission stop" status indicates that an anomalous message from engine ECU 230 connected to communication control device 130 has been detected. Moreover, if engine ECU 230 transmits the message including the transmission ID that is in the black list including the transmission IDs that are not transmitted in a normal state, this means that engine 230 is anomalous. Thus, the message from engine ECU 230 that is anomalous is discarded.

If neither of the aforementioned two conditions is satisfied (N in Step S1104), communication control device 130 transmits, to network 100, the message from engine ECU 230 (Step S1106) and ends the process.

In Step S1107, communication control device 130 determines whether a message has been received from network 100. If a message has been received from network 100 (Y in Step S1107), communication control device 130 executes Step S1108. If no message has been received from network 100 (N in Step S1107), communication control device 130 executes Step S1112.

In Step S1108, communication control device 130 determines whether the message received from engine ECU 230 is in processing. If the message from engine ECU 230 is in processing (Y in Step S1108), communication control device 130 waits until the process is completed. If the message from engine ECU 230 is not in processing (N in Step S1108), communication control device 130 executes Step S1109.

In Step S1109, communication control device 130 determines whether the message received from network 100 is an anomaly notification message including the IDS ID (or more specifically, an anomaly notification message indicating an anomalous transmission ID list) and also the hash value of the transmission ID list included in the anomaly notification message matches the hash value of the transmission ID list stored in communication control device 130. If the anomaly notification message satisfies the aforementioned conditions (Y in Step S1109), communication control device 130 shifts into the "transmission stop" status (S1110) and ends the process. This enables the process to proceed from Step S1104 to Step S1105 from then on, and thus keeps an anomalous message from being transmitted to network 100 from engine ECU 230, which is anomalous. If the anomaly notification message does not satisfy the aforementioned conditions (N in Step S1110), communication control device 130 transfers (transmits) the message received from network 100 to engine ECU 230 (S1111) and ends the process. In this case, the message received from network 100 is transferred to engine ECU 230, because this message is, for example, a normal message instead of an anomaly notification message or an anomaly notification message to be transmitted to a different target ECU.

Note that the anomaly notification message may include the transmission ID list itself. In this case, communication control device 130 may determine in Step S1109 whether the transmission ID list included in the anomaly notification message matches the transmission ID list stored in communication control device 130. Moreover, the anomaly notification message may include the device ID. In this case, communication control device 130 may determine in Step S1109 whether the device ID included in the anomaly notification message matches the device ID of communication control device 130. In either of these two cases, communication control device 130 is capable of identifying the communication control device that is the destination of the anomaly notification message.

In Step S1112, communication control device 130 determines it is a timing of transmitting information related to the transmission ID list (that is, the hash value of the transmission ID list or the transmission ID list) according to an internal timer. If it is the timing of transmitting the information related to the transmission ID list (Y in Step S1112), communication control device 130 includes, for example, the hash value of the transmission ID list into a message and transmits, to network 100, this message having, as a message ID, the device ID predetermined for communication control device 130 (S1113). Then, communication control device 130 ends the process here. This enables anomaly detection ECU 220 receiving this message to determine that the hash value of the transmission ID list included in the message is the hash value of communication control device 130. If it is not the timing of transmitting the transmission ID list (N in Step S1112), communication control device 130 returns to Step S1101.

Note that, in Step S1112, communication control device 130 may include the transmission ID list itself into the message and then transmit this message to network 100. Here, the hash value of the transmission ID list is smaller in data size than the transmission ID list itself. On this account, the amount of data can be reduced by transmitting the message including the hash value of the transmission ID list.

As described thus far, communication control device 130 adds the transmission ID included in the message received from engine ECU 230 connected to communication control device 130, into the transmission ID list. Then, communication control device 130 transmits the information related to the transmission ID list to network 100 periodically, for example. For instance, anomaly detection ECU 220 that previously stores the information related to the normal transmission ID list related to the message transmitted from engine ECU 230 is provided on network 100. Thus, if engine ECU 230 is falsely reprogrammed for example and transmits an anomalous message to network 100, communication control device 130 transmits the information related to the transmission ID list to network 100. Anomaly detection ECU 220 receives the information related to the transmission ID list that is transmitted from communication control device 130 and may include an anomalous transmission ID. Then, anomaly detection ECU 220 verifies the information related to the transmission ID list against the normal transmission ID list to detect an anomaly. This enables anomaly detection to be performed for each ECU on the basis of the corresponding transmission ID list of the ECU. Thus, an anomalous ECU can be detected accurately. As a result, only an anomalous ECU can be disconnected without mistakenly determining a normal ECU as an anomalous ECU. This leads to enhancement of the safety of mobility network system 10.

[1.13 Different Process Performed by Communication Control Device]

Although the process performed by communication control device 130 is described above with reference to the flowchart in FIG. 11, this is not intended to be limiting. In FIG. 11, the transmission ID list is periodically transmitted according to the internal timer. However, communication control device 130 may transmit the information related to the transmission ID list only when receiving a message that includes a predetermined identifier indicating a request for the information related to the transmission ID list.

This eliminates the need to periodically transmit, from communication control device 130 to network 100, the message that includes the information related to the transmission ID list. Thus, a load of network 100 can be reduced. The process is described more specifically, with reference to FIG. 12.

Figure 12:
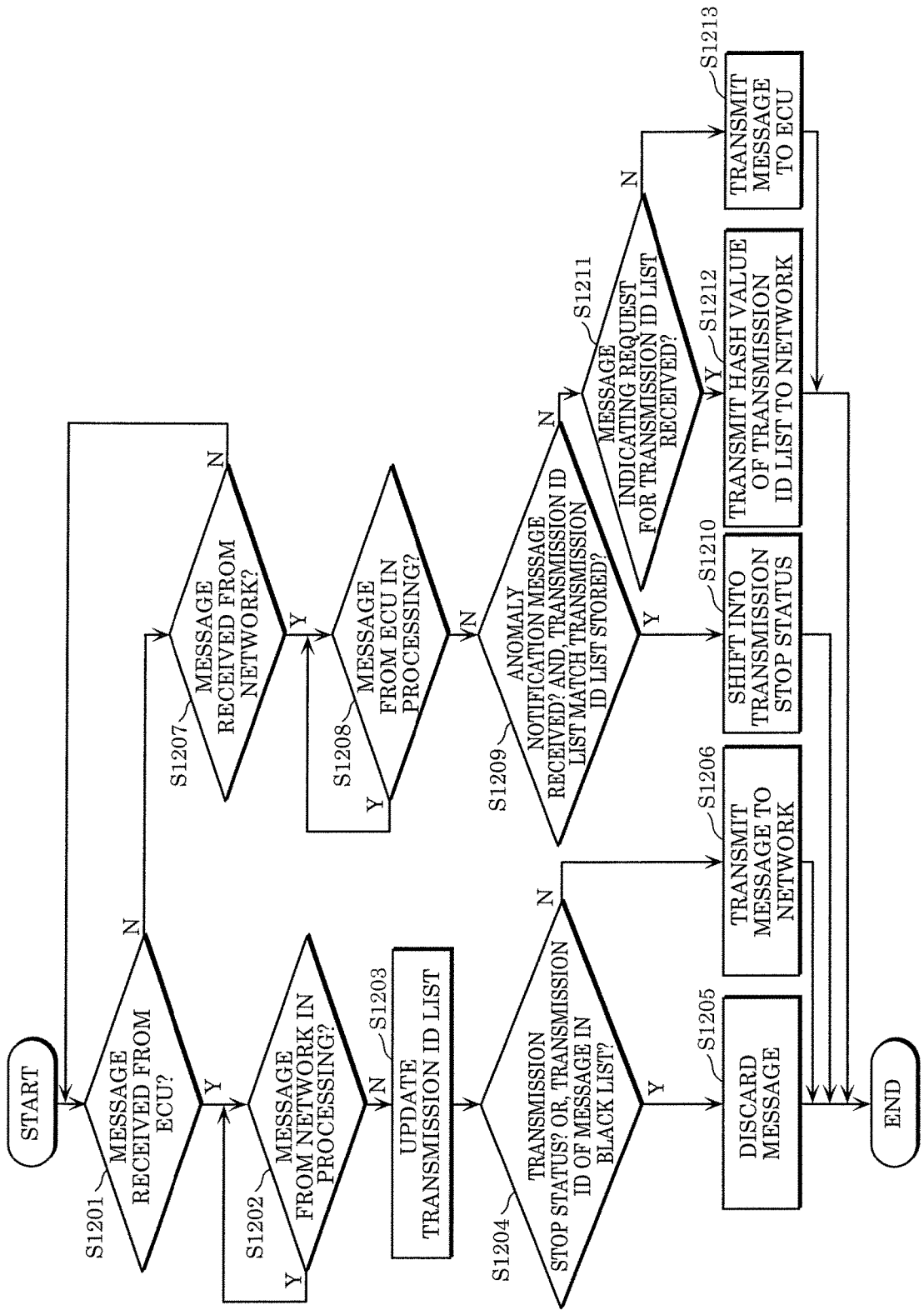
FIG. 12 is a flowchart of a different process performed by the communication control device, according to Embodiment 1.

The following describes the process performed by communication control device 130 when receiving the message indicating the request for transmission of the information related to the transmission ID list, with reference to a flowchart in FIG. 12.

FIG. 12 is a flowchart of a different process performed by communication control device 130, according to the present embodiment.

In Step S1201, communication control device 130 determines whether a message has been received from engine ECU 230. If a message has been received from engine ECU 230 (Y in Step S1201), communication control device 130 executes Step S1202. If no message has been received from engine ECU 230 (N in Step S1201), communication control device 130 executes Step S1207.

In Step S1202, communication control device 130 determines whether the message received from network 100 is in processing. If the message from network 100 is in processing (Y in Step S1202), communication control device 130 waits until the process is completed. If the message from network 100 is not in processing (N in Step S1202), communication control device 130 executes Step S1203.

In Step S1203, communication control device 130 updates the transmission ID list stored in transmission ID list holder 116, on the basis of the transmission ID included in the message received from engine ECU 230. After this, communication control device 130 executes Step S1204.

In Step S1204, communication control device 130 determines whether the status of communication control device 130 is "transmission stop" or the transmission ID included in the message received from engine ECU 230 is in the black list stored in black list holder 115. Communication control device 130 is in the "transmission stop" status when Step S1210 described later is executed.

If either one of the aforementioned two conditions is satisfied (Y in Step S1204), communication control device 130 discards the message (Step S1205) and ends the process.

If neither of the aforementioned two conditions is satisfied (N in Step S1204), communication control device 130 transmits, to network 100, the message from engine ECU 230 (Step S1206) and ends the process.

In Step S1207, communication control device 130 determines whether a message has been received from network 100. If a message has been received from network 100 (Y in Step S1207), communication control device 130 executes Step S1208. If no message has been received from network 100 (N in Step S1207), communication control device 130 returns to Step S1201.

In Step S1208, communication control device 130 determines whether the message received from engine ECU 230 is in processing. If the message from engine ECU 230 is in processing (Y in Step S1208), communication control device 130 waits until the process is completed. If the message from engine ECU 230 is not in processing (N in Step S1208), communication control device 130 executes Step S1209.

In Step S1209, communication control device 130 determines whether the message received from network 100 is an anomaly notification message including the IDS ID and also the hash value of the transmission ID list included in the anomaly notification message matches the hash value of the transmission ID list stored in communication control device 130. If the anomaly notification message satisfies the aforementioned conditions (Y in Step S1209), communication control device 130 shifts into the "transmission stop" status (S1210) and ends the process. If the anomaly notification message does not satisfy the aforementioned conditions (N in Step S1209), communication control device 130 executes Step S1211.

In Step S1211, communication control device 130 determines whether the message received from network 100 is a message indicating a request for the information related to the transmission ID list. More specifically, communication control device 130 determines whether the message received from network 100 includes the predetermined identifier indicating the request for the information related to the transmission ID list. If the message indicates the request for the information related to the transmission ID list (such as the hash value of the transmission ID list) (Y in Step S1211), communication control device 130 includes the hash value of the transmission ID list into a message and transmits this message to network 100 (S1212). Then, communication control device 130 ends the process here. In this way, the transmission ID list can be transmitted according to the request from the outside. This reduces effects on network traffic at a normal time. If the message does not indicate the request for the information related to the transmission ID list (N in Step S1211), communication control device 130 transfers (transmits) the message received from network 100 to engine ECU 230 (S1213) and ends the process. In this case, the message received from network 100 is transferred to engine ECU 230, because this message is, for example, a normal message instead of an anomaly notification message or an anomaly notification message to be transmitted to a different target ECU.

[1.14 Different Process Performed by Communication Control Device]

Although the processes performed by communication control device 130 are described above with reference to the flowcharts in FIG. 11 and FIG. 12, a yet different process performed by communication control device 130 is described as follows. For example, only when the transmission ID list of communication control device 130 is updated, the hash value of the transmission ID list or the transmission ID list may be transmitted to network 100.

This eliminates the need to periodically transmit, from communication control device 130 to network 100, the message that includes the information related to the transmission ID list. Thus, a load of network 100 can be reduced. The process is described more specifically, with reference to FIG. 13.

Figure 13:
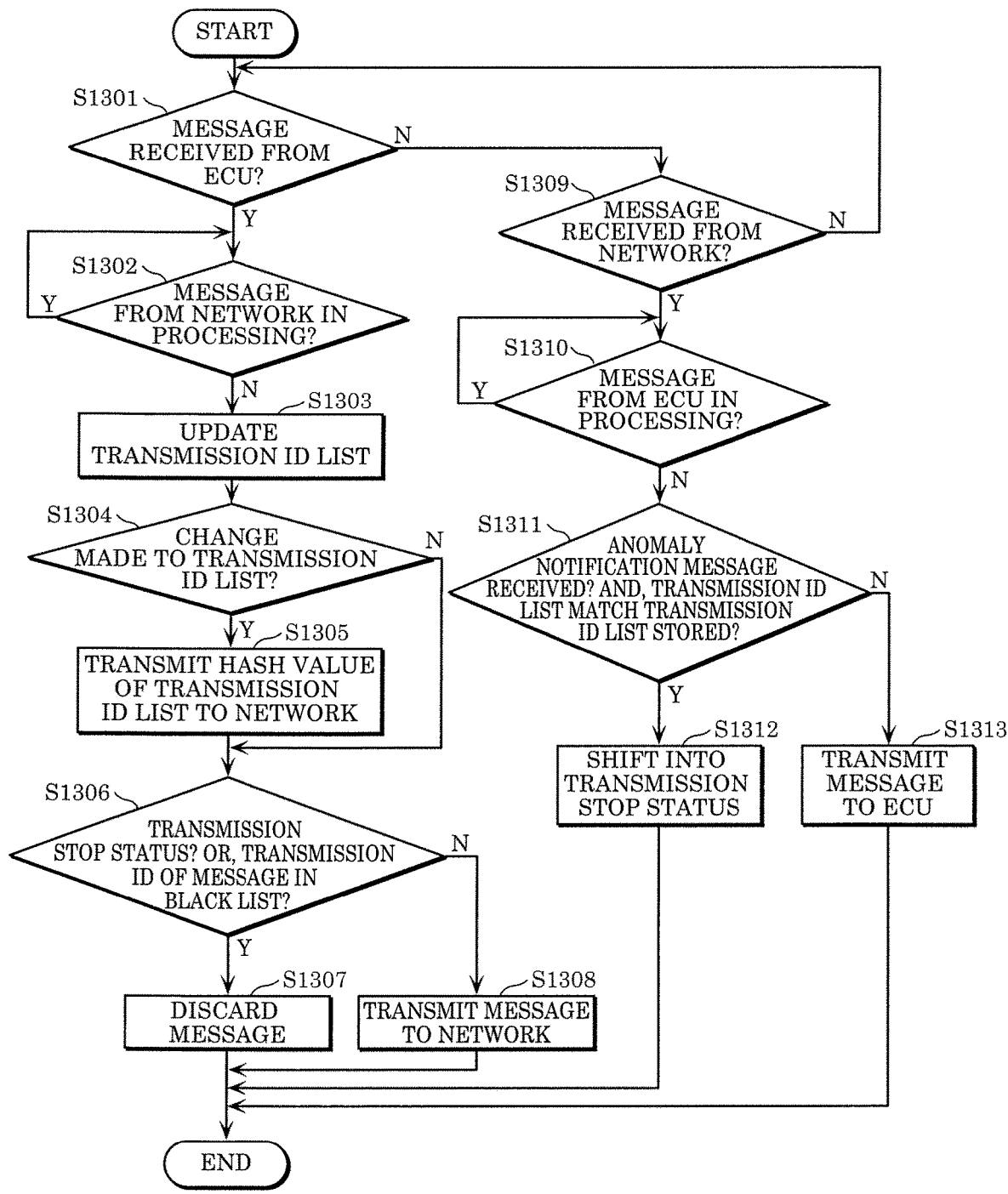
FIG. 13 is a flowchart of a yet different process performed by the communication control device, according to Embodiment 1.

The following describes the process performed by communication control device 130 to transmit the information related to the transmission ID list of communication control device 130 when the transmission ID list is updated, with reference to a flowchart in FIG. 13.

FIG. 13 is a flowchart of a yet different process performed by communication control device 130, according to the present embodiment.

In Step S1301, communication control device 130 determines whether a message has been received from engine ECU 230. If a message has been received from engine ECU 230 (Y in Step S1301), communication control device 130 executes Step S1302. If no message has been received from engine ECU 230 (N in Step S1301), communication control device 130 executes Step S1309.

In Step S1302, communication control device 130 determines whether the message received from network 100 is in processing. If the message from network 100 is in processing (Y in Step S1302), communication control device 130 waits until the process is completed. If the message from network 100 is not in processing (N in Step S1302), communication control device 130 executes Step S1303.

In Step S1303, communication control device 130 updates the transmission ID list stored in transmission ID list holder 116, on the basis of the transmission ID included in the message received from engine ECU 230. After this, communication control device 130 executes Step S1304.

In Step S1304, communication control device 130 determines whether any change was made to the transmission ID list in Step S1303. If any change was made to the transmission ID list (Y in Step S1304), communication control device 130 transmits a message including the information related to the transmission ID list (such as the hash value of the transmission ID list) to network 100 (S1305) and executes Step S1306. If no change was made to the transmission ID list (N in Step S1304), communication control device 130 executes Step S1306. Thus, the information related to the transmission ID list is transmitted when the transmission ID list is updated. This reduces effects on network traffic.

In Step S1306, communication control device 130 determines whether the status of communication control device 130 is "transmission stop" or the transmission ID included in the message received from engine ECU 230 is in the black list stored in black list holder 115. Communication control device 130 is in the "transmission stop" status when Step S1312 described later is executed.

If either one of the aforementioned two conditions is satisfied (Y in Step S1306), communication control device 130 discards the message (Step S1307) and ends the process.

If neither of the aforementioned two conditions is satisfied (N in Step S1306), communication control device 130 transmits, to network 100, the message from engine ECU 230 (Step S1308) and ends the process.

In Step S1309, communication control device 130 determines whether a message has been received from network 100. If a message has been received from network 100 (Y in Step S1309), communication control device 130 executes Step S1310. If no message has been received from network 100 (N in Step S1309), communication control device 130 returns to Step S1301.

In Step S1310, communication control device 130 determines whether the message received from engine ECU 230 is in processing. If the message from engine ECU 230 is in processing (Y in Step S1310), communication control device 130 waits until the process is completed. If the message from engine ECU 230 is not in processing (N in Step S1310), communication control device 130 executes Step S1311.

In Step S1311, communication control device 130 determines whether the message received from network 100 is an anomaly notification message including the IDS ID and also the hash value of the transmission ID list included in the anomaly notification message matches the hash value of the transmission ID list stored in communication control device 130. If the anomaly notification message satisfies the aforementioned conditions (Y in Step S1311), communication control device 130 shifts into the "transmission stop" status (S1312) and ends the process. If the anomaly notification message does not satisfy the aforementioned conditions (N in Step S1311), communication control device 130 transfers the message received from network 100 to engine ECU 230 (S1313) and ends the process.

[1.15 Process Performed by Anomaly Detection ECU]

Next, a process performed by anomaly detection ECU 220 is described.

Figure 14:
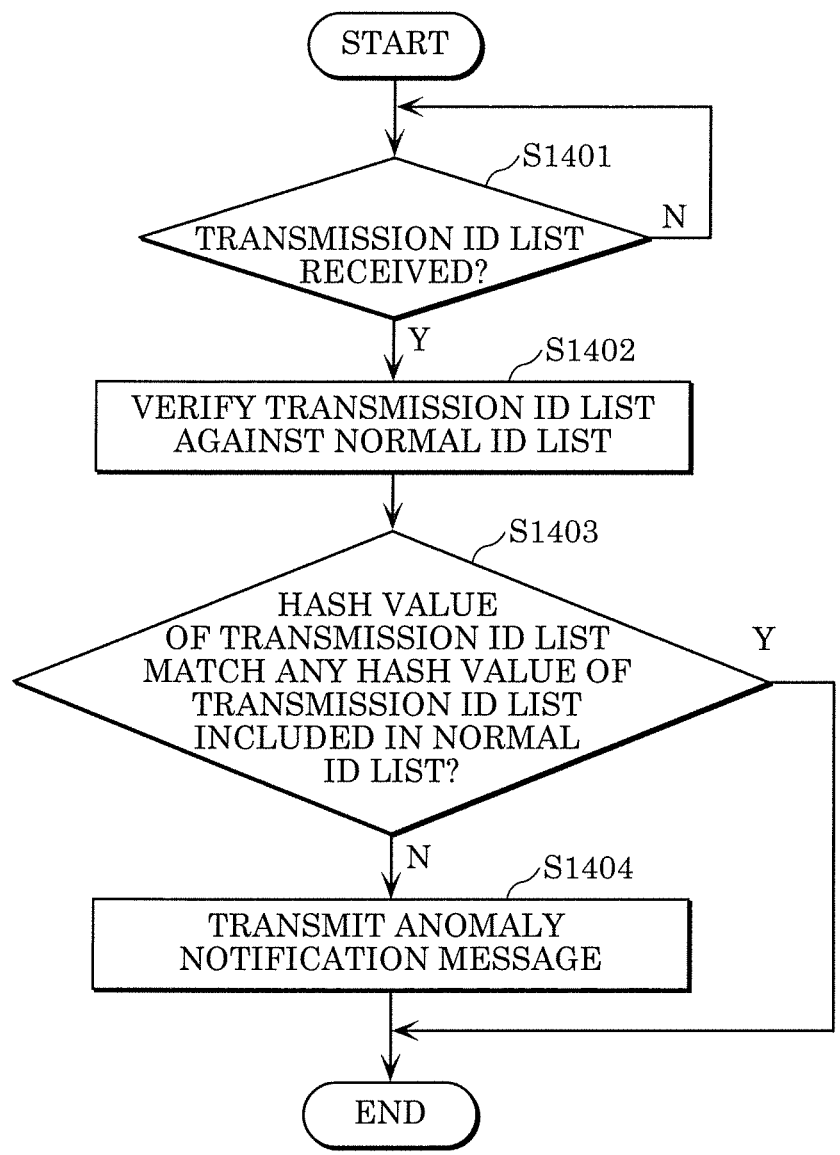
FIG. 14 is a flowchart of a process performed by the anomaly detection ECU, according to Embodiment 1.

FIG. 14 is a flowchart of the process performed by anomaly detection ECU 220, according to the present embodiment.

In Step S1401, anomaly detection ECU 220 determines whether the information related to the transmission ID list has been received. Whether the information related to the transmission ID list has been received is determined by, for example, whether the ID of the received message is the predetermined device ID. If the information related to the transmission ID list has been received (Y in Step S1401), anomaly detection ECU 220 verifies the information related to the received transmission ID list (such as the hash value of the transmission ID list) against the one or more pieces of information related to the normal transmission ID lists stored in normal ID list holder 224 (such as the hash values of the normal transmission ID lists) (S1402). Then, anomaly detection ECU 220 executes Step S1403. If no information related to the transmission ID list has been received (N in Step S1401), anomaly detection ECU 220 returns to Step S1401.

In Step S1403, anomaly detection ECU 220 determines whether the hash value of the received transmission ID list matches any of the one or more hash values of the normal transmission ID lists.

If the aforementioned condition is not satisfied (N in Step S1403), anomaly detection ECU 220 transmits, to network 100, an anomaly notification message, which includes the hash value of the received transmission ID list (that is, the information related to the transmission ID list that does not match any of the one or more pieces of information related to the normal transmission ID lists) and has the IDS ID, to indicate that the hash value of the received transmission ID list is anomalous (S1404). Then, anomaly detection 220 ends the process.

If the aforementioned condition is satisfied (Y in Step S1403), anomaly detection ECU 220 ends the process.

As described thus far, anomaly detection ECU 220 previously stores the information related to the normal transmission ID lists related to the messages transmitted from the ECUs provided on network 100. Anomaly detection ECU 220 verifies the information related to the transmission ID list that is received from network 100 and may include an anomalous transmission ID against the information related to the normal transmission ID lists. Thus, an anomalous ECU can be detected accurately, and the safety of mobility network system 10 can be enhanced.

[1.16. Sequence of Disconnecting Anomalous ECU]

Next, a sequence of disconnecting an anomalous ECU is described.

Figure 15:
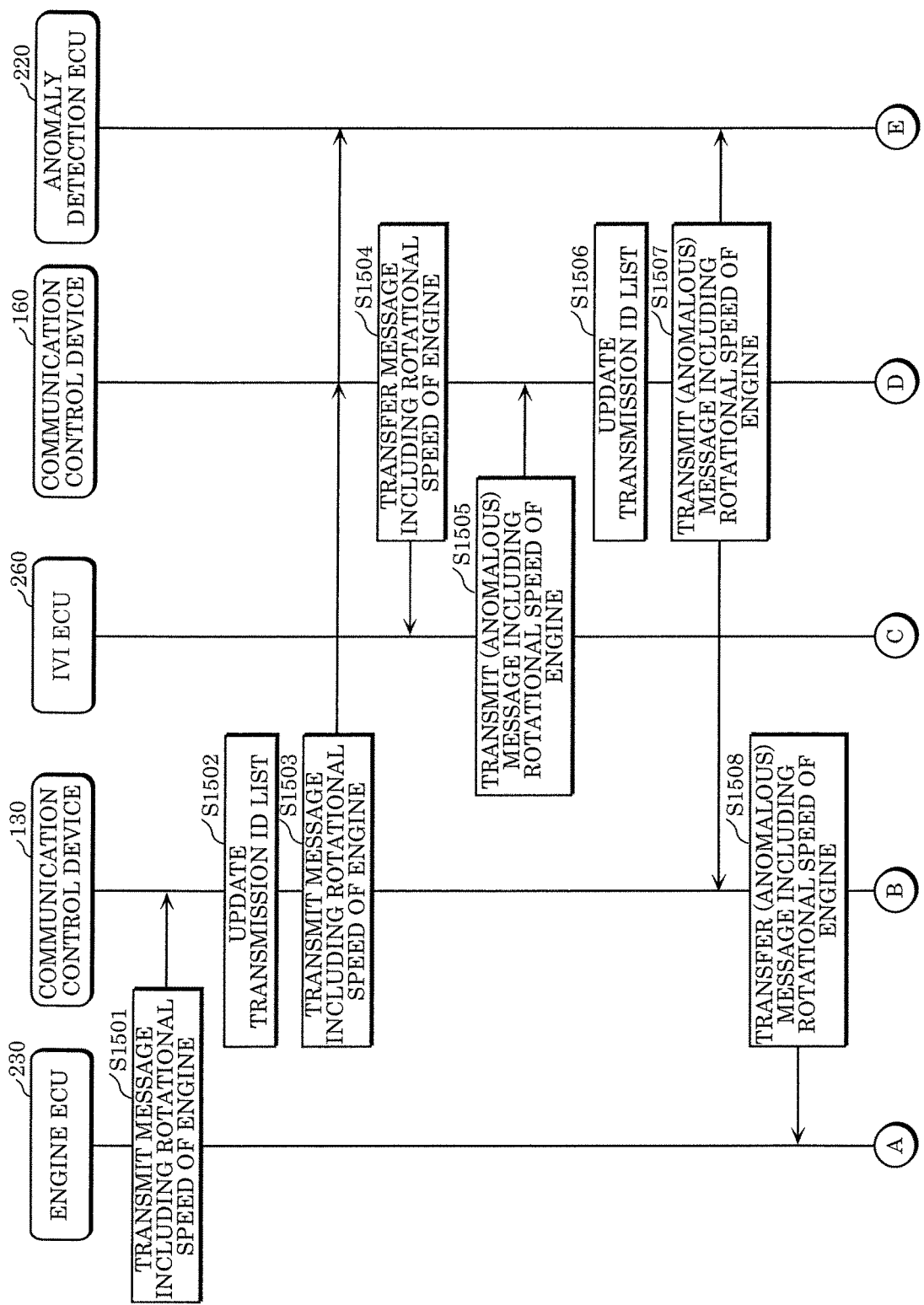
FIG. 15 is a sequence of disconnecting an anomalous ECU, according to Embodiment 1.
Figure 16:
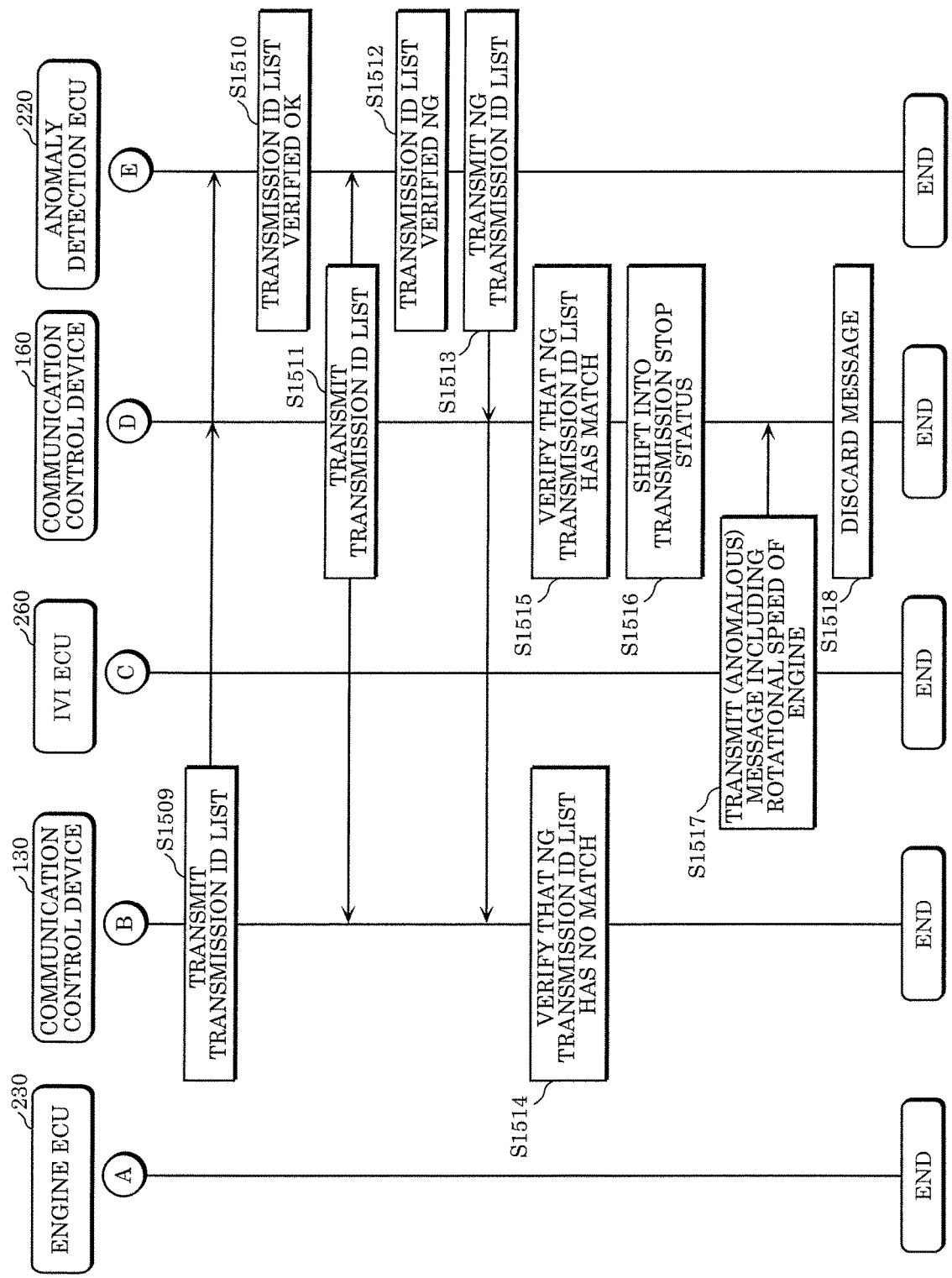
FIG. 16 is a sequence of disconnecting an anomalous ECU, according to Embodiment 1.

Each of FIG. 15 and FIG. 16 is a sequence of disconnecting an anomalous ECU. The sequence in FIG. 16 illustrates a process performed subsequently to the sequence in FIG. 15. Thus, A to E in FIG. 15 correspond to A to E in FIG. 16. Each of FIG. 15 and FIG. 16 illustrates, as an example, a sequence of disconnecting IVI ECU 260 from network 100 when anomaly detection ECU 220 detects IVI ECU 260 as an anomalous ECU that attempts to masquerade as engine ECU 230.

In the sequences of disconnecting an anomalous ECU as illustrated in FIG. 15 and FIG. 16, communication control device 120 connected to anomaly detection ECU 220 performs only a message transfer process. Thus, illustration and detailed description of communication control device 120 is omitted.

In FIG. 15, engine ECU 230 first transmits a message including the rotational speed of the engine (S1501).

Communication control device 130 receives the message transmitted from engine ECU 230 and updates the transmission ID list (S1502).

After this, communication control device 130 transmits the message including the rotational speed of the engine to network 100 (S1503).

Communication control device 160 receives the message including the rotational speed of the engine that is transmitted to network 100, and transfers this message to WI ECU 260 (S1504).

After this, IVI ECU 260, which is anomalous, transmits a message including a rotational speed of the engine in order to, for example, change the rotational speed of the engine controlled by engine ECU 230 to a different rotational speed (S1505). This message includes the rotational speed of the engine and should not be transmitted from IVI ECU 260. Thus, this is an anomalous message.

Communication control device 160 updates the transmission ID list (S1506), and transmits the anomalous message including the rotational speed of the engine to network 100 (S1507). At this time, a transmission ID of the message that should not be transmitted from IVI ECU 260 is added to the transmission ID list of communication control device 160.

Communication control device 130 transfers, to engine ECU 230, the anomalous message including the rotational speed of the engine and transmitted on network 100 (S1508).

Next, in the sequence of FIG. 16 following the sequence of FIG. 15, communication control device 130 transmits a message, which includes the hash value of the transmission ID list and the device ID of communication control device 130, to network 100 at the timing of transmitting the transmission ID list (S1509).

The ID of the transmitted message is the device ID of communication control device 130. Thus, anomaly detection ECU 220 receives the message via communication control device 120 (not shown). Anomaly detection ECU 220 verifies the hash value of the transmission ID list included in the message against the one or more hash values of the normal transmission ID lists. The transmission ID list of communication control device 130 includes no anomalous transmission ID. On this account, anomaly detection ECU 220 verifies that the hash value of the received transmission ID list matches one of the one or more hash values of the normal transmission ID lists (S1510).

Next, communication control device 160 transmits a message, which includes the hash value of the transmission ID list and the device ID of communication control device 160, to network 100 at the timing of transmitting the transmission ID list (S1511).

The ID of the transmitted message is the device ID of communication control device 160. Thus, anomaly detection ECU 220 receives the message via communication control device 120 (not shown). Anomaly detection ECU 220 verifies the hash value of the transmission ID list included in the message against the one or more hash values of the normal transmission ID lists. The transmission ID list of communication control device 160 includes the anomalous transmission ID. On this account, anomaly detection ECU 220 verifies that the hash value of the received transmission ID list matches none of the one or more hash values of the normal transmission ID lists (S1512). This is because IVI ECU 260 transmitted the message including the rotational speed of the engine and the transmission ID list is thereby anomalous. Thus, the hash value of the received transmission ID list matches none of the hash values of the normal transmission ID lists.

After this, anomaly detection ECU 220 transmits, to network 100, an anomaly notification message, which includes the hash value of the received transmission ID list and the IDS ID, to indicate that an anomalous ECU is connected to communication control device 160 (S1513).

The ID of the transmitted message is the IDS ID. Thus, communication control device 130 receives the anomaly notification message from network 100. Communication control device 130 verifies that the hash value of the transmission ID list included in the anomaly notification message does not match the hash value of the transmission ID list stored in communication control device 130 (S1514). More specifically, communication control device 130 verifies that communication control device 130 is not the destination of the received anomaly notification message.

The ID of the transmitted message is the IDS ID. Communication control device 160 receives the anomaly notification message from network 100. Communication control device 160 verifies that the hash value of the transmission ID list included in the anomaly notification message matches the hash value of the transmission ID list stored in communication control device 160 (S1515). More specifically, communication control device 160 verifies that communication control device 160 is the destination of the received anomaly notification message.

After this, communication control device 160 shifts into the "transmission stop" status (S1516). From then on, communication control device 160 does not transmit, to network 100, any message received from IVI ECU 260.

IVI ECU 260 transmits a message including the rotational speed of the engine (S1517). This message includes the rotational speed of the engine and should not be transmitted from IVI ECU 260. Thus, this is an anomalous message.

Having shifted into the "transmission stop" status, communication control device 160 discards the anomalous message including the rotational speed of the engine, or more specifically, does not transmit this message to network 100 (S1518). This enables communication control device 160 to disconnect IVI ECU 260, which is anomalous, from network 100. Moreover, this also reduces effects of anomalous IVI ECU 260 on mobility network system 10.

Other Variations

Although the present disclosure has been described by way of the above embodiment, it should be obvious that that the present disclosure is not limited to the embodiment described above. The following cases are also included in the present disclosure.

For example, the present disclosure is implemented not only as the communication control device or anomaly detection ECU 220, but also as mobility network system 10 including the communication control device and anomaly detection ECU 220.

To be more specific, mobility network system 10 includes an ECU and network 100, the ECU comprising at least one ECU. Mobility network system 10 also includes: a communication control device that connects the ECU to network 100, the communication control device comprising at least one communication control device establishing a one-to-one connection with one of the at least one ECU; and anomaly detection ECU 220 that detects an anomalous ECU of the at least one ECU. The communication control device includes: communicator 118 that receives a message from the ECU connected to the communication control device, transmits the message to network 100, receives a message from network 100, and transmits the message to the ECU; transmission ID list holder 116 that holds a transmission ID list including a transmission ID included in the message transmitted from the ECU; and controller 114 that controls communicator 118 and transmission ID list holder 116. When the transmission ID included in the message transmitted from the ECU is not in the transmission ID list, controller 114 adds the transmission ID to the transmission ID list and transmits information related to the transmission ID list to network 100. Anomaly detection ECU 220 includes: transceiver 221 that transmits a message to network 100 and receives a message from network 100; normal ID list holder 224 that holds information related to at least one normal transmission ID list including a transmission ID included in a normal message to be transmitted from the ECU; and anomaly detector 222 that controls transceiver 221 and normal ID list holder 224. When transceiver 221 receives the information related to the transmission ID list from network 100, anomaly detector 222 verifies the information related to the transmission ID list against the information related to the at least one normal transmission ID list. Anomaly detector 222 includes the information related to the transmission ID list that does not match any of the information related to the at least one normal transmission ID list into an anomaly notification message indicating information related to an anomalous transmission ID list, and transmits the anomaly notification message to network 100.

Moreover, the communication control device may be a connector that connects the ECU to network 100, for example.

Although the above embodiment describes the mobility network as a CAN, this is not intended to be limiting. For example, CAN with flexible data rate (CAN-FD), Ethernet (registered trademark), local interconnect network (LIN), FlexRay (registered trademark), or media oriented systems transport (MOST) may be used. Alternatively, any combination of these may be used.

Although the above embodiment describes the security measures for the mobility network installed in the automobile, the range of application according to the present disclosure is not limited to this. The present disclosure may be applied not only to automobiles, but also to means of mobility, such as construction equipment, farm equipment, ships, trains, and airplanes. More specifically, the present disclosure is applicable as the security measures for mobility networks and mobility network systems.

In the above embodiment, the communication control device transmits the hash value of the transmission ID list to the network. However, the communication control device may transmit the transmission ID list instead of the hash value of the transmission ID list, as described above. This allows anomaly detection ECU 220 to know in detail the ID of the data frame transmitted from another ECU. Thus, anomaly detection ECU 220 can issue a request to stop transmission of only a data frame having an anomalous ID. This is effective in view of safety enhancement.

In the above embodiment, if the hash value of the anomalous transmission ID list transmitted from the anomaly detection ECU matches the hash value of the transmission ID list stored in the communication control device, the communication control device shifts into the "transmission stop" status to block a data frame from the ECU connected to the communication control device. However, the communication control device may not shift into the "transmission stop" status in response to the matched hash values. Alternatively, a different action other than the transmission stop may be taken.

For example, if the hash value of the anomalous transmission ID list transmitted from the anomaly detection ECU matches the hash value of the transmission ID list stored in the communication control device, the communication control device may transmit, to network 100, a data frame indicating the matched hash values and a detailed transmission ID list.

With this, the anomaly detection ECU can obtain detailed information used for determining a process to be performed for the communication control device that determines the received transmission ID list is anomalous. Thus, an appropriate process in response to the circumstances can be performed.

In the above embodiment, all data frames from the ECU are blocked when, for example, the communication control device is in the "transmission stop" status. However, not all the data frames may be blocked. For example, when a transmission stop request message regarding a specific ID is received from the anomaly detection ECU, the communication control device may add the specific ID to the black list stored in the communication control device and stop transmission of only a data frame having the specific ID.

In the above embodiment, the communication control device stores the transmission ID list. However, the transmission ID list may be stored in a nonvolatile memory, or reset whenever an ignition is turned on. Alternatively, the communication control device may store a transmission ID list transmitted during a predetermined period of time.

In the above embodiment, the communication control device transmits the information related to the transmission ID list. However, the communication control device may transmit information other than the information related to the transmission ID list. For example, controller 114 may further count the number of messages transmitted from the ECU and transmit information related to the number of messages to network 100. Controller 114 may additionally transmit the number of messages per unit time or the number of IDs included in the transmitted messages. This enables anomaly detection ECU 220 to detect not only an anomaly of the transmission ID list but also an anomaly in terms of the numbers of transmissions. Thus, an anomalous ECU can be detected more accurately.

For example, anomaly detection ECU 220 may transmit normal transmission ID lists, and then the communication control device may determine whether to stop transmission of a data frame from the ECU depending on whether the transmission ID list stored in the communication control device is among the normal transmission ID lists. The communication control device may stop the transmission of the data frame from the ECU when, for example, a period of time during which the transmission ID list stored in the communication control device is not among the normal transmission ID lists transmitted from anomaly detection ECU 220 lasts for a predetermined period of time.

In the above embodiment, when a data frame having a transmission ID included in the black list is received from the ECU, the communication control device stops transmission of this data frame. At this time, assuming that an anomalous ECU is connected, the communication control device may notify anomaly detection ECU 220 that the transmission ID included in the black list has been transmitted. This allows an anomalous behavior of this ECU to be detected at an earlier time. Moreover, this is effective in view of safety enhancement.

In the above embodiment, if the information related to the transmission ID list received by anomaly detection ECU 220 does not match any of the one or more pieces of information related to the normal transmission ID lists stored in anomaly detection ECU 220, the transmission ID list is detected to be anomalous. However, even if the transmission ID list does not match any of the normal transmission ID lists, the transmission ID list may not be determined to be anomalous. For example, an ID included in a data frame transmitted from, for instance, the communication control device connected to the diagnostic port may be variable dynamically. However, it may be unrealistic for anomaly detection ECU 220 to store all imaginable patterns of transmission ID list. Thus, if the number of transmission ID lists having no match in the normal transmission ID lists during a predetermined period of time is a predetermined number or less, anomaly detection ECU 220 may not notify network 100 that an anomalous transmission ID list has been detected.

In the above embodiment, the normal transmission ID lists are stored in anomaly detection ECU 220 as an example. However, the normal transmission ID lists may not be stored in anomaly detection ECU 220. In this case, whenever receiving a transmission ID list from any of the communication control devices, anomaly detection ECU 220 updates and stores the transmission ID list. By updating the transmission ID list, anomaly detection ECU 220 may detect that an anomalous data frame has been transmitted from an anomalous ECU. Alternatively, when the transmission ID list is updated a predetermined number of times during a predetermined period of time, anomaly detection ECU 220 may determine that an anomalous data frame has been transmitted from an anomalous ECU. This eliminates the necessity for anomaly detection ECU 220 to previously store the normal transmission ID lists and thus achieves efficient system development.

In the above embodiment, anomaly detection ECU 220 detects an anomalous ECU by verifying the transmission ID list against the normal transmission ID lists. The method of detecting an anomalous ECU is not limited to this. For example, a different anomaly detection algorithm may be implemented in anomaly detection ECU 220. With this algorithm, anomaly detection ECU 220 may detect that an anomalous ECU is connected. Alternatively, connection of an anomaly ECU may be detected on the basis of a combination of a result of the aforementioned different anomaly detection algorithm and a result of the verification against the normal transmission ID lists.

In the above embodiment, the anomaly detection ECU detects the connection of an anomalous ECU only by determining whether the transmission ID list matches the normal transmission ID list. In addition to this, matching may be performed between the device IDs. For example, the normal transmission ID list may additionally store the device IDs received thus far in association with their matching normal transmission ID lists. Then, if the correspondence between the device IDs and the lists is disturbed, this indicates that connection of an anomalous ECU is detected.

In the above embodiment, the communication control device connected to network 100 includes transmission ID list holder 116 and controller 114 that blocks transmission. However, the communication control device may not include these components. For example, a transceiver or a switch may include such components.

Each of the devices according to the above-described embodiments may be a computer system including a microprocessor, a Read Only Memory (ROM), a Random Access Memory (RAM), a hard disk unit, a display unit, a keyboard, a mouse, and the like. The RAM or the hard disk unit holds a computer program. The microprocessor operates according to the computer program, thereby causing the constituent elements to execute their functions. Here, the computer program includes combinations of instruction codes for issuing instructions to the computer to execute predetermined functions.

It should also be noted that a part or all of the constituent elements in each of the devices according to the above-described embodiments may be implemented into a single Large Scale Integration (LSI). The system LSI is a super multi-function LSI that is a single chip into which a plurality of constituent elements are integrated. More specifically, the system LSI is a computer system including a microprocessor, a ROM, a RAM, and the like. The RAM holds a computer program. The microprocessor operates according to the computer program, thereby causing the system LSI to execute their functions.

Each of the constituent elements included in each of the above-described device may be integrated separately, or a part or all of them may be integrated into a single chip.

The system LSI is described here, but the integrated circuit may also be referred to as an integrated circuit (IC), an LSI, a super LSI or an ultra LSI depending on the degree of integration. Moreover, the circuit integration technique is not limited to LSI, and may be realized by a dedicated circuit or a general purpose processor. After manufacturing of the LSI, a field programmable gate array (FPGA) or a reconfigurable processor which is reconfigurable in connection or settings of circuit cells inside the LSI may be used.

Further, when development of a semiconductor technology or another derived technology provides a circuit integration technology which replaces LSI, as a matter of course, functional blocks may be integrated by using this technology. Adaption of biotechnology, for example, is a possibility.

It should also be noted that a part or all of the constituent elements included in each of the above-described devices may be implemented into an Integrated Circuit (IC) card or a single module which is attachable to and removable from the device. The IC card or the module is a computer system including a microprocessor, a ROM, a RAM, and the like. The IC card or the module may include the above-described super multi-function LSI. The microprocessor operates according to the computer program to cause the IC card or the module to execute its functions. The IC card or the module may have tamper resistance.

The present disclosure can be implemented not only as a communication control device but also as a communication control method including steps (processes) executed by components included in the communication control device.

The communication control method is executed by the communication control device in mobility network system 10 including an ECU and network 100, the ECU comprising at least one ECU. The communication control device establishes a one-to-one connection between network 100 and the ECU and includes: communicator 118 that receives a message from the ECU, transmits the message to network 100, receives a message from network 100, and transmits the message to the ECU; and transmission ID list holder 116 that holds a transmission ID list including a transmission ID included in the message transmitted from the ECU. The communication control method includes: adding the transmission ID included in the message transmitted from the ECU to the transmission ID list when the transmission ID is not in the transmission ID list (Step S1103 in FIG. 11, for example); and transmitting information related to the transmission ID list to network 100 (Step S1113 in FIG. 11, for example).

The present disclosure can be implemented not only as anomaly detection ECU 220 but also as an anomaly detection method including steps (processes) executed by components included in anomaly detection ECU 220.

The anomaly detection method is executed by anomaly detection ECU 220 that detects an anomalous electronic control unit of at least one ECU in mobility network system 10 including the at least one electronic control unit and network 100. Anomaly detection ECU 220 includes: transceiver 221 that transmits a message to network 100 and receives a message from network 100; and normal ID list holder 224 that holds information related to at least one normal transmission ID list including a transmission ID included in a normal message to be transmitted from the at least one ECU. The anomaly detection method includes: when transceiver 221 receives, from network 100, information related to a transmission ID list including a transmission ID included in a message transmitted from the at least one ECU (N in Step S1401 in FIG. 14), verifying the information related to the transmission ID list against the information related to the at least one normal transmission ID list (Step S1402 in FIG. 14), and including the information related to the transmission ID list that does not match any of the information related to the at least one normal transmission ID list into an anomaly notification message indicating information related to an anomalous transmission ID list, and transmitting the anomaly notification message to network 100 (Step S1404).

Furthermore, the present disclosure may be a computer program executed by a computer to perform these methods, or digital signals forming the computer program.

The present disclosure may be a computer-readable recording medium on which the computer program or the digital signals are recorded. Examples of the computer-readable recording medium are a flexible disk, a hard disk, a Compact Disc-Read Only Memory (CD-ROM), a magnetooptic disk (MO), a Digital Versatile Disc (DVD), a DVD-ROM, a DVD-RAM, a BD (Blu-ray® Disc), and a semiconductor memory. An aspect of the present disclosure may be the digital signals recorded on the recording medium.

The present disclosure may be implemented by transmitting the computer program or the digital signals via an electric communication line, a wired or wireless communication line, a network represented by the Internet, data broadcasting, and the like.

The present disclosure may be a computer system including a microprocessor and a memory. The memory stores the computer program and the microprocessor operates according to the computer program.

It is also possible that the program or the digital signals may be recorded onto the recording medium to be transferred, or may be transmitted via a network or the like, so that the program or the digital signals can be executed by a different independent computer system.

The present disclosure may be any combination of the above-described embodiments and variations.

INDUSTRIAL APPLICABILITY

The present disclosure can be used for, for example, a vehicle equipped with a mobility network.

What is claimed is:

1. A communication control device that is included in a mobility network system including one or more electronic control units and a network,
the communication control device connecting an electronic control unit of the one or more electronic control units to the network, the communication control device being disposed between the network and the electronic control unit,
the electronic control unit being configured to transmit a first message to the network via the communication control device and receive a second message from the network via the communication control device,
the communication control device, comprising:
a communicator that receives the first message from the electronic control unit and transmits the first message to the network, and receives the second message from the network and transmits the second message to the electronic control unit;
a transmission identification (ID) list holder that holds a transmission ID list including a transmission ID included in the first message transmitted from the electronic control unit; and
a controller that controls the communicator and the transmission ID list holder,
wherein when the transmission ID included in the first message transmitted from the electronic control unit is not in the transmission ID list, the controller adds the transmission ID to the transmission ID list and transmits an ID information item related to the transmission ID list to the network,
the ID information item is the transmission ID list, and
when the communicator receives, from the network, an anomaly notification message indicating an anomalous transmission ID list and the anomalous transmission ID list matches the transmission ID list held in the transmission ID list holder, the controller does not transmit, to the network, a first message including an anomalous transmission ID that is transmitted from the electronic control unit, from then on.

2. The communication control device according to claim 1,
wherein when the communicator receives, from the network, a request message including a predetermined identifier indicating a request for the ID information item, the controller transmits the ID information item to the network.

3. The communication control device according to claim 1,
wherein after the controller adds the transmission ID to the transmission ID list, the controller transmits the ID information item to the network.

4. The communication control device according to claim 1, wherein the controller further counts a total number of the first messages each being the first message transmitted from the electronic control unit and transmits a total-number information item related to the total number of the first messages to the network.

5. The communication control device according to claim 1,
wherein when the communicator receives, from the network, an anomaly notification message indicating an anomalous ID information item related to the anomalous transmission ID list and the anomalous ID information item matches the ID information item held in the transmission ID list holder, the controller does not transmit, to the network, a first message transmitted from the electronic control unit, from then on.

6. A mobility network system that includes one or more electronic control units and a network, the mobility network system comprising:
one or more communication control devices each of which connects a corresponding one of the one or more electronic control units to the network; and
an anomaly detection electronic control unit that detects an anomalous electronic control unit of the one or more electronic control units,
wherein each of the one or more communication control devices is the communication control device according to claim 1, and
the anomaly detection electronic control unit includes:
a transceiver that transmits a message to the network and receives a message from the network;
a normal ID list holder that holds one or more normal ID information items each of which is related to a normal transmission ID list including a transmission ID included in a normal message to be transmitted from a corresponding one of the one or more electronic control units; and
an anomaly detector that controls the transceiver and the normal ID list holder,
when the transceiver receives, from the network, the ID information item related to a transmission ID list including a transmission ID included in a message transmitted from an electronic control unit of the one or more electronic control units, the anomaly detector determines whether or not the ID information item matches any of the one or more normal ID information items, and
when the ID information item does not match any of the one or more normal ID information items, the anomaly detector adds the ID information item into an anomaly notification message indicating an anomalous ID information item related to an anomalous transmission ID list, transmits the anomaly notification message to the network, and transmits a disconnection request message to the electronic control unit that has transmitted the message among the one or more electronic control units.

7. A communication control method that is executed by a communication control device in a mobility network system including, the mobility network system including one or more electronic control units and a network,
the communication control device connecting an electronic control unit of the one or more electronic control units to the network, the communication control device being disposed between the network and the electronic control unit,
the electronic control unit being configured to transmit a first message to the network via the communication control device and receive a second message from the network via the communication control device,
the communication control device comprising:
a communicator that receives the first message from an electronic control unit of the one or more electronic control units and transmits the first message to the network, and receives the second message from the network and transmits the second message to the electronic control unit; and
a transmission ID list holder that holds a transmission ID list including a transmission ID included in the first message transmitted from the electronic control unit,
the communication control method comprising:
adding the transmission ID included in the first message transmitted from the electronic control unit to the transmission ID list when the transmission ID is not in the transmission ID list; and
transmitting an ID information item related to the transmission ID list to the network,
wherein the ID information item is the transmission ID list, and
when the communicator receives, from the network, an anomaly notification message indicating an anomalous transmission ID list and the anomalous transmission ID list matches the transmission ID list held in the transmission ID list holder, the controller does not transmit, to the network, a first message including an anomalous transmission ID that is transmitted from the electronic control unit, from then on.

8. An non-transitory computer-readable recording medium embodied with a program to cause a computer to execute the communication control method according to claim 7.

* * * * *